United States Patent
Sawayama et al.

(10) Patent No.: US 7,797,020 B2
(45) Date of Patent: Sep. 14, 2010

(54) FOLDABLE CELLULAR TELEPHONE

(75) Inventors: Kohji Sawayama, Higashihiroshima (JP); Satoshi Mizuno, Higashihiroshima (JP); Yonosuke Amano, Higashihiroshima (JP); Tamaki Nakamura, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 673 days.

(21) Appl. No.: 11/709,682

(22) Filed: Feb. 23, 2007

(65) Prior Publication Data

US 2007/0173299 A1  Jul. 26, 2007

Related U.S. Application Data

(62) Division of application No. 11/581,125, filed on Oct. 16, 2006, now Pat. No. 7,577,461, which is a division of application No. 10/465,869, filed on Jun. 20, 2003, now Pat. No. 7,155,253.

(30) Foreign Application Priority Data

Jun. 21, 2002  (JP) .............................. 2002-180953

(51) Int. Cl.
*H04M 1/00* (2006.01)
(52) U.S. Cl. .................. 455/556.1; 455/90.1; 455/90.2; 455/90.3; 455/344; 455/550.1; 455/566; 455/575.3; 348/14.01; 348/14.02; 348/211.2; 439/13
(58) Field of Classification Search ............... 455/90.1, 455/90.2, 90.3, 344, 550.1, 556.1, 575.3; 348/14.01, 14.02, 211.2; 439/13
See application file for complete search history.

(56) References Cited

U.S. PATENT DOCUMENTS

| 6,125,286 | A | 9/2000 | Jahagirdar et al. |
| 6,304,763 | B1 | 10/2001 | Jahagirdar et al. |
| 6,532,035 | B1 | 3/2003 | Saari et al. |
| 7,155,253 | B2 * | 12/2006 | Sawayama et al. ....... 455/556.1 |
| 7,577,461 | B2 * | 8/2009 | Sawayama et al. ....... 455/556.1 |

(Continued)

FOREIGN PATENT DOCUMENTS

| CN | 1302152 A | 7/2001 |
| CN | 1379609 A | 11/2002 |
| CN | 1379609 A | 11/2002 |
| DE | 19952682 A1 | 5/2000 |
| DE | 199 61 067 A1 | 6/2000 |

(Continued)

OTHER PUBLICATIONS

Relevant portion of mobile telephone instruction manual "MOVA SH 251i" dated Jun. 1, 2002, pp. 138-163; and English language translation.

NTT DoCoMo Catalogue "SH251i", NTT Docomo Kyushu Co. Ltd., May 2002, pp. 1-3.

(Continued)

*Primary Examiner*—Stephen M D'Agosta
(74) *Attorney, Agent, or Firm*—Birch, Stewart, Kolasch & Birch, LLP

(57) ABSTRACT

A cellular phone includes a first case and a second case, which are connected in a foldable manner through a hinge. When the cellular phone is in a folded state, a second display unit displays an image with the side (upper side) closer to the hinge as the upper side. Accordingly, the user can hold the second case of the cellular phone in his/her hand regardless of whether the cellular phone is in a folded state or in an open state. The user can easily switch between a folded state and an open state with respect to the first case and the second case.

18 Claims, 14 Drawing Sheets

U.S. PATENT DOCUMENTS

| | | | |
|---|---|---|---|
| 2001/0004269 | A1 | 6/2001 | Shibata et al. |
| 2001/0005454 | A1 | 6/2001 | Nishino et al. |
| 2001/0036845 | A1 | 11/2001 | Park |
| 2001/0055987 | A1 | 12/2001 | Tsuchida |
| 2002/0051060 | A1 | 5/2002 | Wada |
| 2002/0077145 | A1 | 6/2002 | Kamiya et al. |
| 2002/0142798 | A1 | 10/2002 | Miyake |
| 2002/0142810 | A1 | 10/2002 | Kawasaki et al. |
| 2002/0160724 | A1 | 10/2002 | Arai et al. |
| 2002/0177330 | A1 | 11/2002 | Haffenden et al. |
| 2005/0157174 | A1 | 7/2005 | Kitamura et al. |

FOREIGN PATENT DOCUMENTS

| | | | |
|---|---|---|---|
| EP | 0 792 077 | A1 | 8/1997 |
| EP | 0 954 150 | A2 | 11/1999 |
| EP | 1 111 919 | A2 | 6/2001 |
| GB | 2 338 141 | A | 12/1999 |
| GB | 2343324 | A | 5/2000 |
| GB | 2 358 985 | A | 8/2001 |
| JP | 01-106581 | A | 4/1989 |
| JP | 09-027939 | | 1/1997 |
| JP | 10-108152 | A | 4/1998 |
| JP | 11017579 | A | 1/1999 |
| JP | 2000-284858 | | 10/2000 |
| JP | 2001-136247 | A | 5/2001 |
| JP | 2001-136248 | A | 5/2001 |
| JP | 2001-136250 | A | 5/2001 |
| JP | 2001-136251 | A | 5/2001 |
| JP | 2001-160950 | | 6/2001 |
| JP | 2001-168961 | | 6/2001 |
| JP | 2001-186226 | | 7/2001 |
| JP | 2001-186227 | A | 7/2001 |
| JP | 2001-186396 | A | 7/2001 |
| JP | 2001282145 | A | 10/2001 |
| JP | 2001-320454 | | 11/2001 |
| JP | 2001-320622 | | 11/2001 |
| JP | 2001-326710 | | 11/2001 |
| JP | 2001333167 | A | 11/2001 |
| JP | 2002-9927 | A | 1/2002 |
| JP | 2001-051131 | A | 2/2002 |
| JP | 2002-05113-5 | A | 2/2002 |
| JP | 2002-051131 | A | 2/2002 |
| JP | 2002-51135 | A | 2/2002 |
| JP | 2002-101160 | A | 4/2002 |
| JP | 2002-101168 | A | 4/2002 |
| JP | 2002118644 | A | 4/2002 |
| JP | 2002-141993 | A | 5/2002 |
| JP | 2002-300237 | A | 10/2002 |
| JP | 2003-188960 | | 7/2003 |
| JP | 2003198682 | | 7/2003 |
| JP | 2003-224628 | A | 8/2003 |
| JP | 2003-289350 | A | 10/2003 |
| JP | 2003-298682 | A | 10/2003 |
| JP | 2003-304308 | | 10/2003 |
| JP | 2003/304308 | | 10/2003 |
| JP | 2003-333149 | A | 11/2003 |
| JP | 2004-15770 | A | 1/2004 |
| WO | WO-03/053027 | A1 | 6/2003 |
| WO | WO-03-053027 | A1 | 6/2003 |

OTHER PUBLICATIONS

"J-Phone Accepting application for Monitor of 3G Trial Service from Dec. 22", K-tai watch, Impress, May 20, 2002, J-SA001, URL. Cellular Phone New Product Show Case, Apr. 1, 2002, A3012CA (white) pp. 1-12.

* cited by examiner

FOLDABLE CELLULAR TELEPHONE

CROSS REFERENCE

This application is a Divisional of co-pending application Ser. No. 11/581,125, filed on Oct. 16, 2006, now U.S. Pat. No. 7,577,461 which is a divisional of Ser. No. 10/465,869, filed on Jun. 20, 2003, (now U.S. Pat. No. 7,155,253 B2), which claims priority to Japanese Patent Application No. 2002-180953, filed Jun. 21, 2002, the entire contents of which are hereby incorporated by reference.

BACKGROUND OF THE INVENTION

1. Field of the Invention

The present invention relates to a cellular telephone with photographing capability, and particularly, a foldable cellular telephone.

2. Description of the Background Art

Cellular telephones now widely used are mainly divided into a straight type, a flip type, and a clam shell type, based on their configuration. The clam shell type phone has higher needs than the other two types by virtue of its compactness allowed by its foldability.

Many recent cellular/mobile telephones incorporate a liquid crystal subdisplay or a camera function at the back side plane of the liquid crystal display.

FIG. 10 shows an example of a conventional clam shell type cellular phone with a camera. This cellular phone 100 is composed of a first case 101 and a second case 102, which are coupled via a hinge 103. Cellular phone 100 has a foldable configuration through the movement with hinge 103 as the axis in angular displacement. Cellular phone 100 of FIG. 10 has a first display unit 104 provided at first case 101. First display unit 104 is arranged so as to be located at the inner side when cellular phone 101 is folded. First display unit 104 (main display) is implemented with a liquid crystal display, an EL (Electro-Luminescent) display, or the like to display an image based on image data transmitted via a first display driver provided in the case. At the back side plane of first case 101 are provided an antenna unit 105 and a helical member 106 that can move up and down. At the side plane of first case 101 is provided a second shutter button 107 of a camera. At the region above first display unit 104, a first speaker 108 used in conversation is provided.

An open/close detection unit 109 is identified as detection means for detecting whether cellular phone 100 attains a folded state or not. A projection 109A is located in the proximity of hinge 103 at the lower region of first case 101. A small hole 109B is located in the proximity of hinge 103 at the upper region of second case 102. A detection switch (not shown) is provided in hole 109B. Projection 109A, hole 109B and the switch constitute open/close detection unit 109. When mobile telephone 100 attains a folded state, projection 109A of first case 101 fits into hole 109B of second case 102 to actuate the detection switch (not shown). Determination is made that cellular phone 100 attains a folded state by means of a control unit provided in the case.

Second case 102 of conventional cellular phone 100 will be described hereinafter. An input button unit 110 is formed of keys and the like to enter numerics and characters. A function button unit 111 is a group of buttons for performing various kinds of setting and function selection in a cellular phone. Function button unit 111 includes a power button 112 to turn the power on/off, a first shutter button 113 corresponding to a camera function that will be described afterwards, a mail/guidance button 114 to conduct mail operation and guidance display, a start/speaker conversation button 115 to initiate conversation through speaker receiver, and a multi-guide button 116 formed of 4-way buttons and a determination button to select and determine the vertical and horizontal direction in the function select screen. A mouthpiece microphone 117 is provided at the lower region of second case 102.

Second case 102 of a common cellular phone generally has the arrangement of hinge 103, function button group 111, input button group 110, and mouthpiece microphone 117 disposed sequentially.

Referring to FIG. 11, the back side plane of first case 101 includes a second display unit 120, a camera unit 121, a light unit 122, and the aforementioned antenna unit 105.

Second display unit 120 is arranged so as to be located at the outer side when cellular phone 100 is folded. Second display unit 120 (subdisplay) is implemented with a liquid crystal display, an EL display, or the like to display an image based on image data transmitted via a second display driver provided in the case.

Camera unit 121 includes an image sensing lens, an image sensing device such as a CCD (Charged Coupled Device) image sensor or a CMOS (Complementary Metal Oxide Semiconductor) image sensor, and a color filter of the three colors of RGB (Red-Green-Blue). In camera unit 2, the light reflected from a subject of image pick up enters the image sensing lens to be converted into light of the three colors of RGB through a color filter, and further provided to said image sensing device. As shown in FIG. 11, camera unit 121 is disposed to be located at the outer side when cellular phone 100 is folded.

Light unit 122 is used as an auxiliary light source when taking a picture through camera unit 121. Although many employ xenon tubes, recent cellular phones have the LEDs (Light Emitting Diode) of RGB illuminated at the same time to provide white light illumination used as the auxiliary light source.

At the back side plane of second case 102 are provided a battery unit 123 to store a battery, and a second speaker 124 to sound a ringing tone.

The manner of using conventional cellular phone 100 in a camera shooting mode will be described hereinafter with reference to FIGS. 14A and 14B. In the case where the user of cellular phone 100 is to take a picture of a subject, the user of cellular phone 100 opens cellular phone 100 and aims camera unit 121 towards the subject of interest, as shown in FIG. 14A. First display unit 104 is used as a viewfinder. In the case where the user of cellular phone 100 is to take a picture of himself/herself, the user can pick up an image while confirming the shooting image by using second display unit 120 as the viewfinder, as shown in FIG. 14B. In the latter case where second display unit 120 is used for the display in camera shooting, many common cellular phones have the image reversed bilaterally to be displayed as a mirror reversed image to eliminate any discomfort in looking into the screen. As the camera shutter button, either first shutter button 113 or second shutter button 107 located at the side plane of first case 101 may be used when in the state corresponding to FIG. 14A. In the state corresponding to FIG. 14B, second shutter button 107 is used for shooting with cellular phone 100 in a folded state. However, shooting in an open state is also allowed. In this case, second shutter button 107 located at the side plane of first case 101 is to be used.

The above-described clam shell type onboard camera cellular phone including two display means has various shortcomings.

The first problem is the matter of changing the hand holding position. As to the vertical orientation of the clam shell type cellular phone in an open state and a folded state, the cellular phone is used with helical member 106 located at the upper side as shown in FIGS. 10 and 12, respectively. Therefore, when the user takes a picture of himself/herself with cellular phone 100 closed (refer to FIG. 14B), and then proceeds to the next operation of shooting a different subject (refer to FIG. 14A) or conducting various image settings through first display unit 104, the user must change his/her hand holding position by rotating 180 degrees the top and bottom position of cellular phone 100, and then open cellular phone 100.

In the case where cellular phone 100 is to be used in an open state after looking at a mail message, an incoming phone call designation, or the time through second display unit 120, the hand holding position of cellular phone 100 must be changed by rotating cellular phone 100 upside down, and then open cellular phone 100.

In the opposite case where cellular phone 100 is to be used in a folded state from an open state, the hand holding position of cellular phone 100 must be changed in the opposite direction after being folded. The action of changing the hand holding position to appropriately match the usage manner of the cellular phone is tedious for the user.

The second problem is that antenna unit 105 provided at the back side plane of first case 101 occupies a relatively large region. The trend in cellular phones is to provide a larger area of second display unit 120, i.e., the subdisplay at the back side plane, so that more information can be displayed for the user even if the cellular phone is folded. However, it is appreciated from FIGS. 11 and 12 that antenna unit 105 occupies a relatively large area at the back side plane of first case 101, restricting the degree of freedom in the arrangement of subdisplay unit 120. It was not possible to provide a large area for the subdisplay.

The third problem is also associated with the antenna. Antenna unit 105 is formed having a convex configuration at the back side plane of first case 101. If buttons such as the shutter button and subdisplay operation buttons are to be provided at this back side plane, antenna unit 105 will cause inconvenience in the operation of the user depressing such buttons with his/her finger. There was a problem that button manipulation is disturbed.

The fourth problem is related to the compactness of a cellular phone. Although the demand for a compact cellular phone is mandatory, cellular phone 100 with a camera must have a predetermined thickness to incorporate the lens and the CCDs constituting camera unit 21. In the case where the camera unit is disposed at the leading end of first case 101, the leading end cannot be reduced in thickness since the thickness to accommodate the camera unit is required. In the opposite case where the camera unit is disposed at the hinge side, the user's hand may block the field of view of the lens when shooting is conducted with cellular phone 100 in a folded state. This is not adaptable to practicable usage.

The fifth problem is associated with hand shaking. In the case where the camera unit is disposed at the leading end of first case 101 and shooting is to be conducted with the cellular phone in an open state, the camera unit will be located far away from the hand of the user who is holding second case 102. Therefore, the effect of hand shaking is greatest under such circumstances. If the camera unit is disposed at the hinge side and shooting is to be conducted with cellular phone 100 in a folded state, the user's hand may block the field of view of the lens, as described in the above fourth problem. Therefore, this is not adaptable to practical usage.

SUMMARY OF THE INVENTION

In view of the foregoing, an object of the present invention is to improve the operability and convenience of a cellular phone.

According to an aspect of the present invention, a cellular phone includes a first case, a second case, and a coupling unit to couple the first and second cases in a foldable manner. The first case includes a first display unit located at the inner side when the cellular phone is in a folded state. The cellular phone attains a folded state and an open sate by the first and second cases pivoting about the coupling unit. The first case also includes a second display unit and an image pick-up unit located at the outer side when the cellular phone is in the folded state. The cellular phone further includes a display control unit causing the second display unit to display an image picked up through the image pick-up unit with the side closer to the coupling unit located at the upper side when the first and second cases are folded.

Accordingly, the image picked up through the image pick-up unit can be displayed at the second display unit located at the same outer side as the image pick-up unit. Therefore, the user can confirm the pick-up image with the coupling unit located at the upper side in the state where the cellular phone is folded. When the user is to look at the pick-up image with the cellular phone in a folded state, he/she no longer has to alter the orientation of the cellular phone or change his/her hand holding position. The operability and convenience of the cellular phone are improved.

According to another aspect of the present invention, a cellular phone includes a first case, a second case, and a coupling unit coupling the first and second cases in a foldable manner. The cellular phone attains a folded state and an open sate by the first and second cases pivoting about the coupling unit. The first case includes a first display unit located at an inner side when the cellular phone is in a folded state, and a second display unit located at an outer side when the cellular phone is in the folded state. The cellular phone further includes an image pick-up unit located at a position also allowing visual confirmation of the second display unit when the first and second cases are in the folded state, and a display control unit causing the second display unit to display an image picked up through the image pick-up unit with the side closer to the coupling unit located at the upper side when the first and second cases are folded.

Accordingly, the image picked up through the image pick-up unit can be displayed at the second display unit located at a position also allowing visual confirmation of the image pick-up unit at the same time. Therefore, the user can confirm the pick-up image with the coupling unit located at the upper side when the cellular phone is in the folded state. When the user views a pick-up image with the cellular phone in the folded state, he/she no longer has to alter the orientation of the cellular phone or change his/her hand holding position. The operability and convenience of the cellular phone are improved.

In the cellular phone of the present aspect, the display control unit preferably causes the second display unit to display an image picked up through the image pick-up unit with the side closer to the coupling unit located at the lower side in the state where the cellular phone is in the open state.

Accordingly, the display unit to display the image picked up by the image pick-up unit can be switched appropriately in accordance with the operation of the user folding or opening the cellular phone. Therefore, the user does not have to change his/her hand holding position of the cellular phone in response to a folding or opening operation, as required in a conventional cellular phone. Therefore, the operability and convenience of the cellular phone are improved.

According to a further aspect of the present invention, a cellular phone includes a first case, a second case, and a coupling unit coupling the first and second cases in a foldable manner. The cellular phone attains a folded state and an open sate by the first and second cases pivoting about the coupling unit. The first case includes a first display unit located at an inner side when the cellular phone is in the folded state. The first case also includes a second display unit and an image pick-up unit located at an outer side when the cellular phone is in the folded state. The second case includes an antenna. The cellular phone of the present aspect further includes a display control unit causing the second display unit to display an image picked up through the image pick-up unit.

Accordingly, an image picked up by the image pick-up unit can be displayed at the second display unit located at a case different from that of the antenna, and located at the same outer side as the image pick-up unit of the first case. Therefore, the user can confirm the pick-up image through the large screen of the second display unit even when the cellular phone is in the folded state. When the user wants to look at the pick-up image, the user does not have to open/close the cellular phone just to view the image. Also, the image can be confirmed through a relatively larger screen. Thus, the operability and convenience of the cellular phone are improved.

According to still another aspect of the present invention, a cellular phone includes a first case, a second case, and a coupling unit coupling the first and second cases in a foldable manner. The cellular phone attains a folded state and an open sate by the first and second cases pivoting about the coupling unit. The first case includes a first display unit located at an inner side when the cellular phone is in a folded state, and a second display unit located at an outer side when the cellular phone is in the folded state. The second case includes an antenna. The cellular phone further includes an image pick-up unit located at a position also allowing visual confirmation of the second display unit when the cellular phone is in the folded state, and a display control unit causing the second display unit to display an image picked up through the image pick-up unit.

Accordingly, the image picked up by the image pick-up unit can be displayed at the second display unit located at a case different from that of the antenna, and located at a position also allowing visual confirmation of the image pick-up unit. Therefore, the user can confirm the pick-up image through a large screen of the second display unit even when the cellular phone is folded. When the user wants to look at the pick-up image, the user does not have to open/close the cellular phone just to view the image. Also, the image can be confirmed through a relatively larger screen. Thus, the operability and convenience of the cellular phone are improved.

In the cellular phone of the present aspect, the display control unit preferably causes the second display unit to display an image picked up through the image pick-up unit with the side closer to the coupling unit located at the upper side when the cellular phone is in the folded state, and with the side closer to the coupling unit located at the lower side when the cellular phone is in the open state with the first and second cases not folded.

Thus, the display unit displaying the image picked up by the image pick-up unit can be switched appropriately in accordance with the operation of folding or closing the cellular phone. The user can confirm the picked-up image with the coupling unit located at the upper side in the state where the cellular phone attains a folded state. The user no longer has to change his/her hand holding position of the cellular phone in accordance with the folding or opening operation, as required in a conventional cellular phone. In other words, the operability and convenience of the cellular phone are improved.

According to a still further aspect of the present invention, a cellular phone includes a first case, a second case, and a coupling unit coupling the first and second cases in a foldable manner. The cellular phone attains a folded state and an open sate by the first and second cases pivoting about the coupling unit. The first case includes a first display unit located at an inner side when the cellular phone is in the folded state, and a second display unit located at an outer side when the cellular phone is in the folded state. The cellular phone includes an image pick-up unit arranged between the coupling unit and the second display unit, and a display control unit causing the second display unit to display an image picked up through the image pick-up unit.

Accordingly, the image pick-up unit is located closer to the coupling unit than the second display unit. Since the region of the first case in the proximity of the coupling unit is the region where a large connector and the like to establish coupling with the second case must be provided, the thickness of the first case will not change even if the image pick-up unit is disposed at this region.

The leading end side of the first case, opposite to the coupling unit side, requires only a thickness corresponding to the second display unit that is thinner than the image pick-up unit.

By disposing the image pick-up unit closer to the coupling unit side than the second display unit, the leading end of the first case can be reduced in thickness without affecting the thickness of the region in the proximity of the coupling unit.

Therefore, the entire cellular phone can be reduced in size. This leads to reduction in the fabrication cost for manufacturers of cellular phones. Furthermore, the convenience for the user is improved by virtue of compactness.

The arrangement of the image pick-up unit in the neighborhood of the coupling unit allows the effect of handshaking to be reduced during shooting with the cellular phone in the open state since the user will hold the second case at the region close to the image pick-up unit.

In the case where the cellular phone is in a folded state, the coupling unit is located at the upper side. The image pick-up unit will be located upper than the second display unit. Therefore, when the user holds the cellular phone in a folded state to conduct shooting, the user's hand will no longer block the image pick-up unit. Therefore, the user can hold the cellular phone without having to be aware of the location of the image pick-up unit when shooting is to be conducted with the cellular phone in a folded state. Thus, the operability and convenience of the cellular phone are improved.

According to yet a further aspect of the present invention, a cellular phone includes a first case, a second case, and a coupling unit coupling the first and second cases in a foldable manner. The cellular phone attains a folded state and an open sate by the first and second cases pivoting about the coupling unit. The first case includes a first display unit located at an inner side when the cellular phone is in the folded state, and a second display unit located at an outer side when the cellular phone is in the folded state. The cellular phone further includes an image pick-up unit arranged between the coupling unit and the second display unit, and a display control unit causing the second display unit to display an image picked up through the image pick-up unit with the side closer to the coupling unit located at the upper side in the state where the cellular phone is in the folded state.

Accordingly, the coupling unit is located at the upper side, and the image pick-up unit is located upper than the second display unit when the cellular phone is in the folded state. Therefore, when the user holds the cellular phone in the folded state to pick-up an image, the user's hand will not block the image pick-up unit. The user can hold the cellular phone without having to be aware of the location of the image pick-up unit when shooting is to be conducted with the cellular phone in a folded state. Therefore, the operability and convenience of the cellular phone are improved.

According to yet another aspect of the present invention, a cellular phone includes a case, a second case, and a coupling unit coupling the first and second cases in a foldable manner. The cellular phone attains a folded state and an open sate by the first and second cases pivoting about the coupling unit. The first case includes a first display unit located at an inner side when the cellular phone is in the folded state. The first case also includes a second display unit and an image pick-up unit located at the outer side when the cellular phone is in the folded state. The second case includes a shutter button at an inner side region used to store an image picked up by the image pick-up unit when the cellular phone is in the folded state. The second case also includes an antenna. The image pick-up unit is arranged between the coupling unit and the second display unit.

Accordingly, the image picked up by the image pick-up unit can be displayed at the second display unit located at a case different from that of the antenna and the shutter button, and located at the same outer side as the image pick-up unit of the first case. Therefore, the user can confirm a pick-up image through a larger screen of the second display unit even when the cellular phone is in the folded state. Furthermore, the event of the user's hands blocking the image pick-up unit when manipulating the shutter button can be avoided. When the user wants to look at the pick-up image, the user does not have to open/close the cellular phone just to view the image. Also, the image can be confirmed through a relatively larger screen. Furthermore, the user can operate the shutter button without having to be aware of the location of the image pick-up unit. Thus, the operability and convenience of the cellular phone are improved.

In the cellular phone of the present invention, the second case preferably includes a shutter button located at an outer side region when the cellular phone is in the folded state, used to store an image picked up by the image pick-up unit.

Accordingly, when the user is to take a picture of himself/herself with the cellular phone in the folded state, shooting is allowed by operating the shutter button provided at the outer side of the first case. The user can easily identify the position of the shutter button with the cellular phone in the folded state. Therefore, the shooting operation is facilitated. Thus, the user does not have to look for a small shutter button provided at the side of the first case and that was not easily discernable, as in a conventional cellular phone.

In the cellular phone of the present invention, the second case preferably includes an operation unit to operate on a display in the second display unit. The operation unit is located at an outer side when the cellular phone is in the folded state.

Therefore, various information including function setting, an address list, mail confirmation/display and the like can be selectively displayed or dispatched through the second display unit. Zooming and the like of the picked-up image are allowed through the operation unit even if the cellular phone is in the folded state. Therefore, many operations can be conducted even when the cellular phone attains the folded state. The operability and convenience of the cellular phone are improved.

Preferably, the cellular phone of the present invention further includes an operation control unit rotating 180° an image picked up by the image pick-up unit when the first and second cases are in the folded state and storing the rotated image.

Therefore, the stored image can be displayed always in the same vertical orientation regardless of whether being displayed through the first display unit or the second display unit, and whether the cellular phone is in the folded state or an open state. Thus, the event of an image picked up with the cellular phone in a folded state being displayed upside down when reproduced afterwards can be avoided. The operability and convenience of a cellular phone are improved.

The foregoing and other objects, features, aspects and advantages of the present invention will become more apparent from the following detailed description of the present invention when taken in conjunction with the accompanying drawings

DESCRIPTION OF THE PREFERRED EMBODIMENTS

Figure 1:
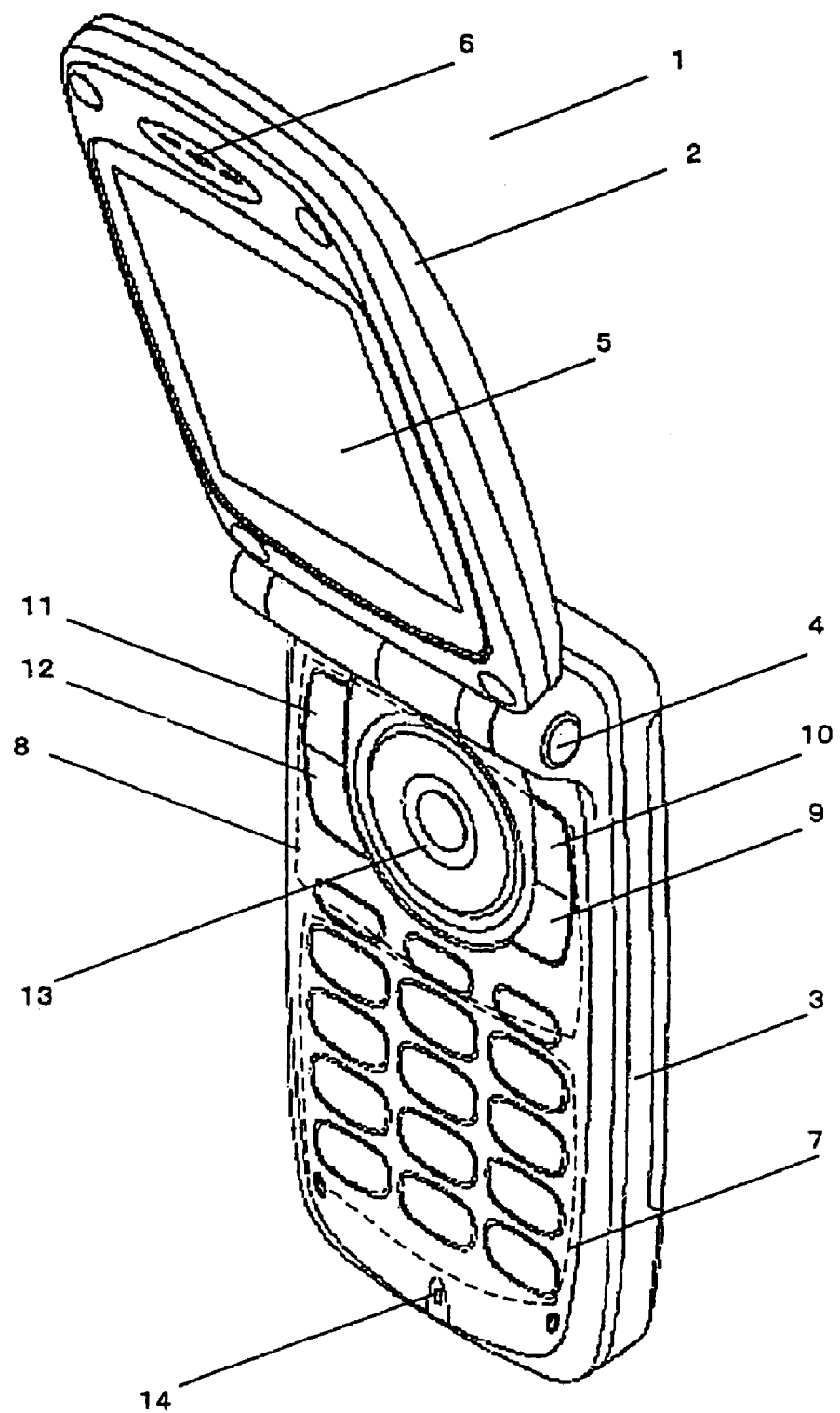
FIG. 1 is a perspective view of an appearance of a cellular phone according to an embodiment of the present invention.

Embodiments of the present invention will be described with reference to the drawings. Referring to FIG. 1, a cellular phone 1 of the present invention includes a first case 2 and a second case 3, coupled via a hinge 4. Cellular phone 1 has a foldable configuration through the movement with hinge 4 as the axis in angular displacement. Cellular phone 1 includes a first display unit 5 at first case 2. First display unit 5 is arranged so as to be located at an inner side when cellular phone 1 is folded. In the present specification, the inner side when cellular phone 1 is folded refers to the side where first case 2 and second case 3 abut against each other when folded. The outer side refers to the side where first case 2 and second case 3 do not abut against each other when folded. First display unit 5 is implemented with a liquid crystal display, an EL display or the like to display an image based on image data transmitted via a first display driver 43 that will be described afterwards. A first speaker 6 used in conversation is provided at an upper region of first display unit 5.

Second case 3 of cellular phone 1 will be described hereinafter. An input button group 7 is formed of keys and the like to enter numerics and characters. A function button group 8 is a group of buttons for performing various kinds of setting and function selection in cellular phone 1. Function button group 8 includes a power button 9 to turn on/off the power, first shutter button 10 corresponding to a camera function, a mail/guidance button 11 corresponding to mail function and guidance display, a start/speaker conversation button 12 to initiate conversation through speaker receiver, and a multiguide button 13 formed of 4-way buttons and a determination button to select the vertical and horizontal directions and determination in a function select screen. A mouthpiece microphone 14 is provided at the lower region of second case 102.

Second case 3 of cellular phone 1 generally has hinge 4, function button group 8, input button group 7, and mouthpiece microphone 14 arranged in this order. However, the arrangement is not limited thereto.

Figure 2:
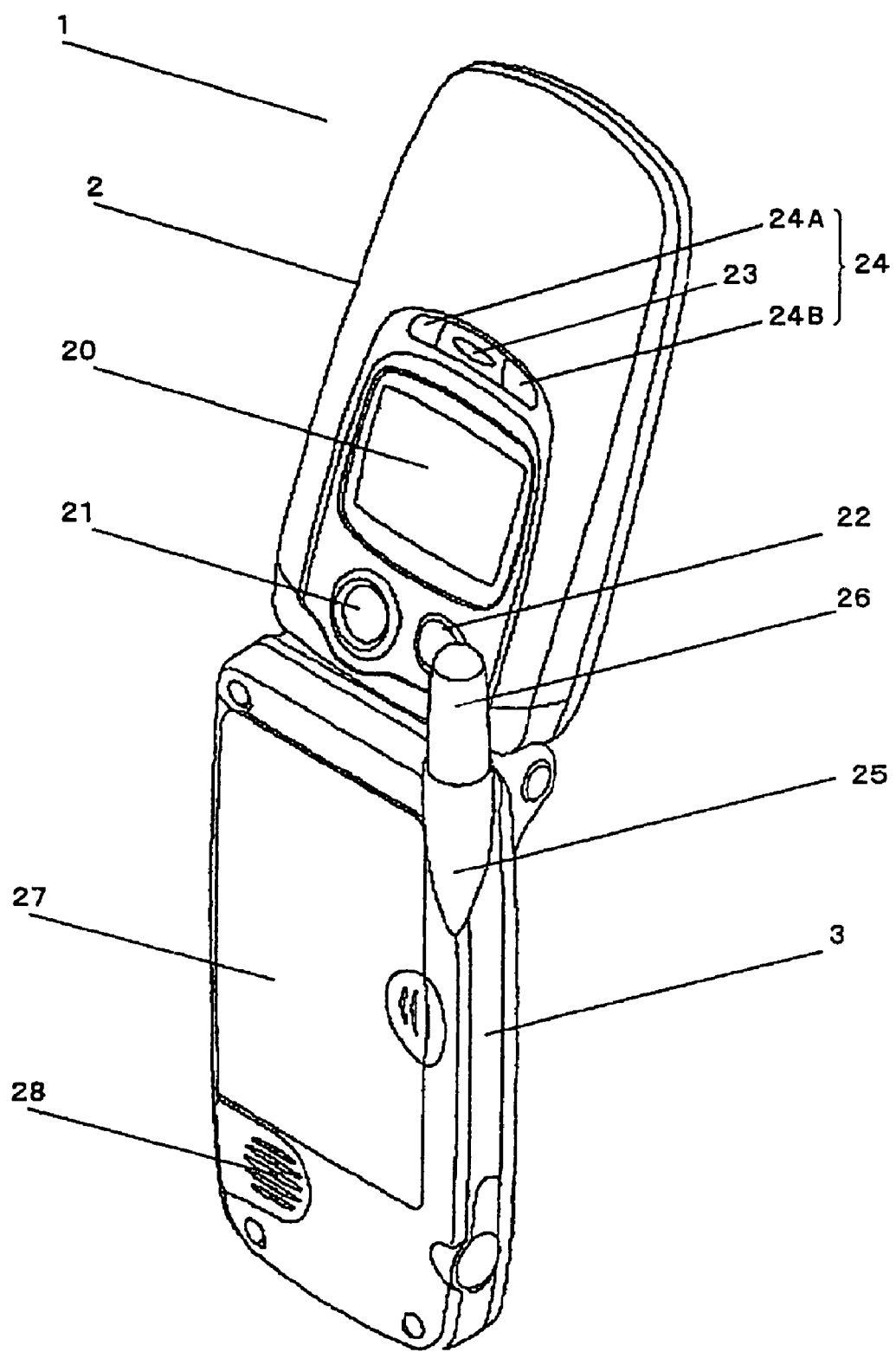
FIG. 2 is a perspective view of the appearance of the cellular phone of FIG. 1 when viewed from the backside.
Figure 3:
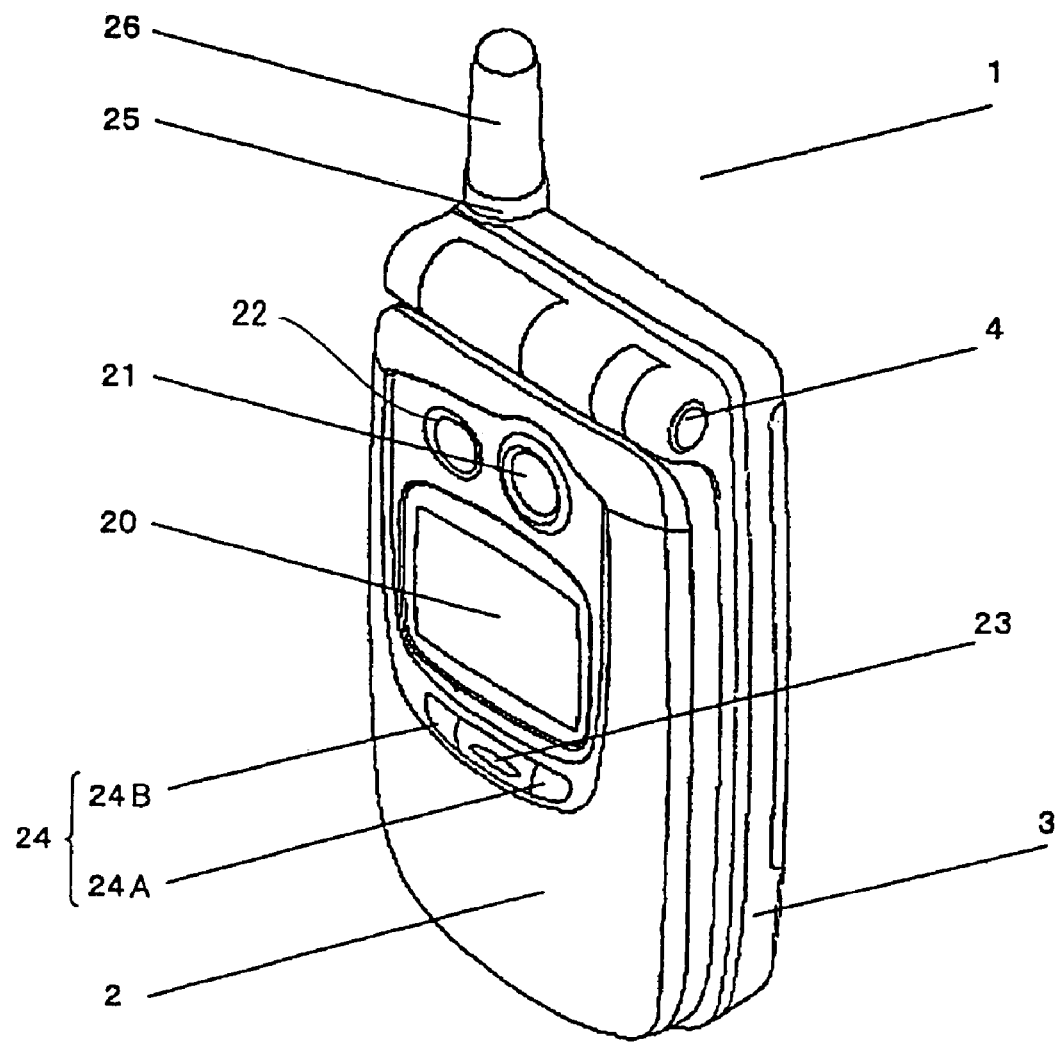
FIG. 3 is a perspective view of the appearance of the cellular phone of FIG. 1 in a folded state.

As shown in FIG. 2 or FIG. 3, the back side plane of first case 2 has a camera unit 21 and a light unit 22 arranged in order from the side of hinge 4. Then, a second display unit 20, a second shutter button 23, and a second operation button group 24 are arranged in this order.

Second display unit 20 is arranged so as to be located at the outer side when cellular phone 1 is folded. Second display unit 20 is implemented with a liquid crystal display, an EL display, or the like to display an image based on image data of a picked-up image transmitted via a second display driver 44 that will be described afterwards, time information, radio field intensity, and character images of mail reception display. When such images are to be displayed, the image data transmitted from second display driver 44 to second display unit 20 is provided so that the region of hinge 4 is located at the upper direction when displayed, i.e. the area of second display unit 20 closer to hinge 4 is located at the upper side. By displaying an image in second display unit 20 so that hinge 4 is located at the upper side, the user will hold cellular phone 1 with hinge 4 located at the upper side when used in a folded state. Therefore, the orientation of second case 3 does not have to be changed even when used in an open state or closed state of cellular phone 1. In other words, the user does not have to change his/her hand holding position of cellular phone 1 each time he/she opens or closes cellular phone 1. Therefore, the operability and convenience are improved. The image display of second display unit 20 can include a pick-up image. When the user wants to look at the pick-up image, the user no longer has to alter the orientation or change the hand holding position of cellular phone 1. Thus, operability and convenience are improved.

By moving the location of the antenna at the back side of first case 2 to another location, the restriction at the back side plane of first case 2 is eliminated. Second display unit 20 larger than the conventional one can be provided. Thus, a great amount of information of texts and images can be displayed. Furthermore, provision of second operation button group 24 allows various displays such as confirming contents of a mail message, looking into an address list, sequential display of a plurality of images, and the like on second display unit 20 even if the cellular phone 1 is used in a closed state. The image display of second display unit 20 also includes pick-up images. The user can confirm a pick-up image through a large screen of second display unit 20 even in a folded state. Therefore, when the user wants to look at the pick-up image, the user does not have to open/close the cellular phone each time just to view the image. The operability and convenience are improved.

Camera unit 21 includes an image sensing lens, an image sensing device such as a CCD (Charge Coupled Device) image sensor or a CMOS (Complementary Metal Oxide Semiconductor) image sensor, and a color filter of the three colors of RGB. In camera unit 21, the light reflected from a subject of image pick up enters the image sensing lens to be converted into light of the three colors of RGB through a color filter, and further provided to said image sensing device. As shown in FIG. 2, camera unit 21 is arranged between hinge 4 and second display unit 20 to be located at the outer side when cellular phone 100 is folded. When the user takes a picture with cellular phone 1 open, the user will conduct shooting holding second case 3. Since camera unit 21 is located close to hinge 4 by the above-described arrangement, the neighborhood of camera unit 21 will be supported by the hand of the user when holding first case 2. Therefore, the effect of hand shaking by the user during shooting can be alleviated. By virtue of a larger second display unit 20 as a result of removing the antenna from the back side of first case 2, the image picked up during the shooting operation can be easily confirmed from the subject side with little hand shaking through a large screen.

Light unit 22 is used as an auxiliary light source when shooting is conducted through camera unit 21. Although many generally employ xenon tubes, recent cellular phones have the LEDs of RGB illuminated at the same time to provide white light illumination used as the auxiliary light source.

Second shutter button 23 is arranged at the middle of the back side plane of first case 2, and is located below second display unit 20 in the state where cellular phone 1 is folded, as shown in FIG. 3. By arranging second shutter button 23 at this position, the user can easily identify the shutter button position with cellular phone 1 in a folded state. Therefore, the shooting operation is facilitated. Also, the user no longer has to look for a small and indiscernible shutter button conventionally provided at the side of the first case, as required in a conventional cellular phone. Thus, operability and convenience are improved.

To the left and right of second shutter button 23 are provided second operation button groups 24A and 24B for various setting/operation based on the contents displayed on second display unit 3. The second operation button group is co-operative with second display unit 20 to perform various setting of functions, display/retrieval in an address list, and mail check/display/dispatch. Also, zooming during shooting, front and back forwarding of a plurality of pick-up images, and the like can be operated.

By disposing second operation button groups 24A and 24B at this position, the user can readily identify the position of second operation button groups 24A and 24B and manipulate the same with cellular phone 1 in a folded state.

Referring to FIG. 2 again, an antenna unit 25, a helical member 26 that can move vertically, a battery unit 27 to store a battery, and a second speaker 28 to sound a ringing tone are provided at the back side plane of second case 3.

Figure 4:
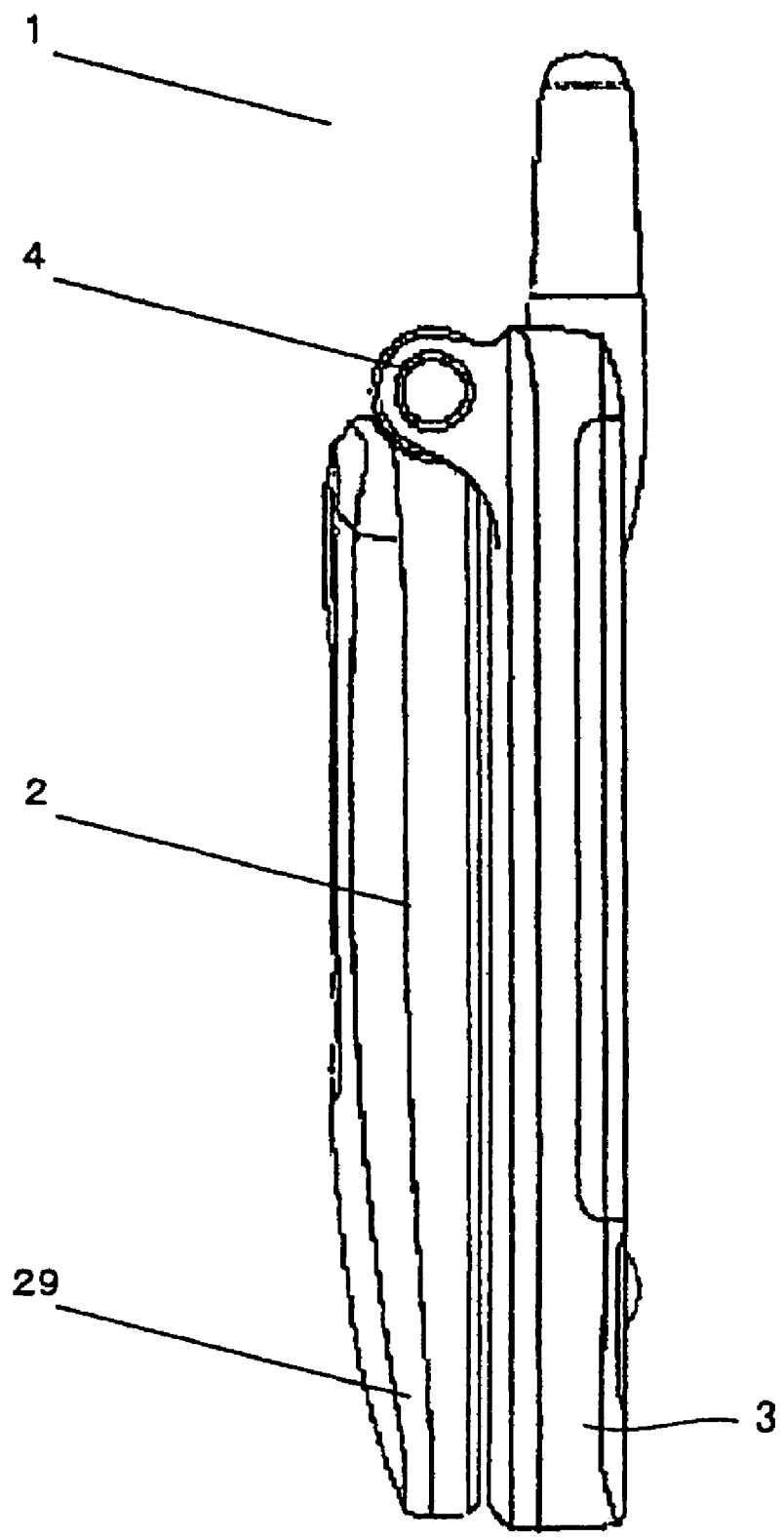
FIG. 4 is a side view of the appearance of the cellular phone of FIG. 1 in a folded state.

Description of cellular phone 1 is further continued with reference to FIGS. 3 and 4.

First case 2 is mechanically connected with second case 3 through hinge 4. A flexible substrate to establish electrical connection between the first and second cases 2 and 3 is incorporated in hinge 4. In the region of first case 2 in the proximity of hinge 4 is provided a connector to connect the flexible circuit board and cables with various circuit boards provided in first case 2. The thickness of the connector most greatly affects the thickness of first case 2. The thickness of camera unit 21 is smaller than that of the conductor. Therefore, arrangement of camera unit 21 in the proximity of the connector will not affect the thickness of first case 2. Therefore, in contrast to a conventional cellular phone having the camera unit arranged in the neighborhood of the leading end of first case 2 (the neighborhood at the lower side in FIG. 3) so that the thickness of second case 2 at the leading end region excluding the antenna unit region depends upon the thickness of the camera unit, the cellular phone of the present embodiment has camera unit 21 arranged between antenna unit 25 and second display unit 20, i.e., in the neighborhood of hinge 4, so that the middle region of first case 2 corresponds to the thickness of second display unit 20 while the leading end of first case 2 can be further reduced in thickness and size. As shown in FIG. 4, first case 2 has the thickness gradually reduced from the center region towards the leading end region. The configuration of cellular phone 1 having the leading end area of first case 2 corresponding to the lower region of cellular phone 1 reduced in thickness in a folded state is advantageous in that the user can readily slide in cellular phone 1 into his/her pocket when not used. Therefore, convenience is improved.

The provision of second display unit 20 between camera unit 21 and second shutter button 23 or second operation button group 24 ensures a predetermined distance between camera unit 21 and second shutter button 23 or second operation button group 24. This eliminates the problem of the user's finger erroneously touching camera unit 21 or blocking the field of view of camera unit 21 when the user is operating second shutter button 23 or second operation button group 24. Preventing the user's finger from inadvertently touching camera unit 21 so as to avoid scratching or adherence of contamination onto the lens and the like will eventually improve the durability and maintain the performance of the cellular phone.

By the structure of holding cellular phone 1 with hinge 4 at the upper side in a folded state, camera unit 21 will not be blocked by the user's hand when held in a folded state. The user can hold cellular phone 1 without having to be aware of the position of camera unit 21.

Figure 5A:
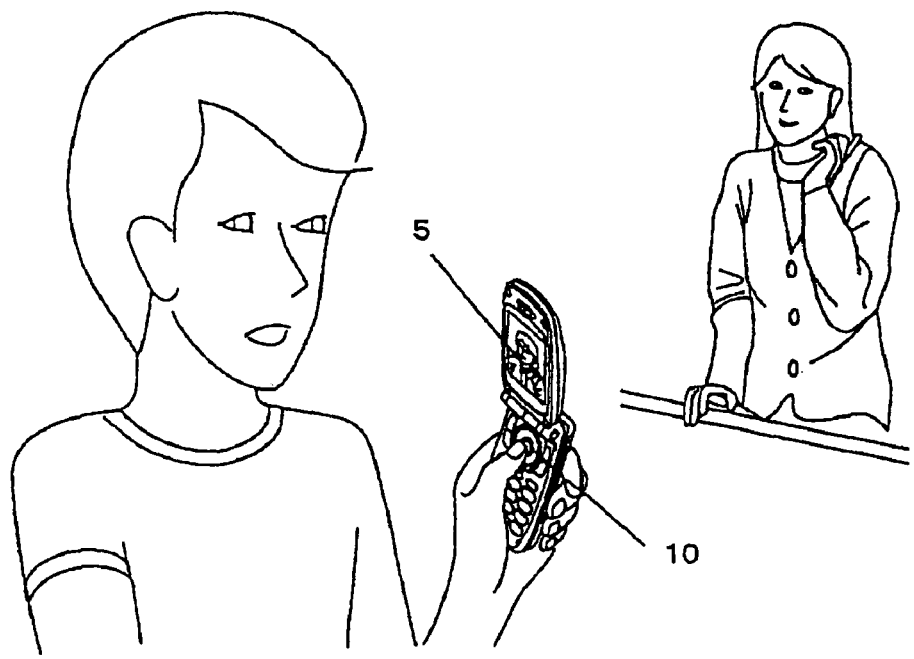
FIG. 5A shows a general manner of a user of the cellular phone of FIG. 1 taking a picture of a subject.
Figure 5B:
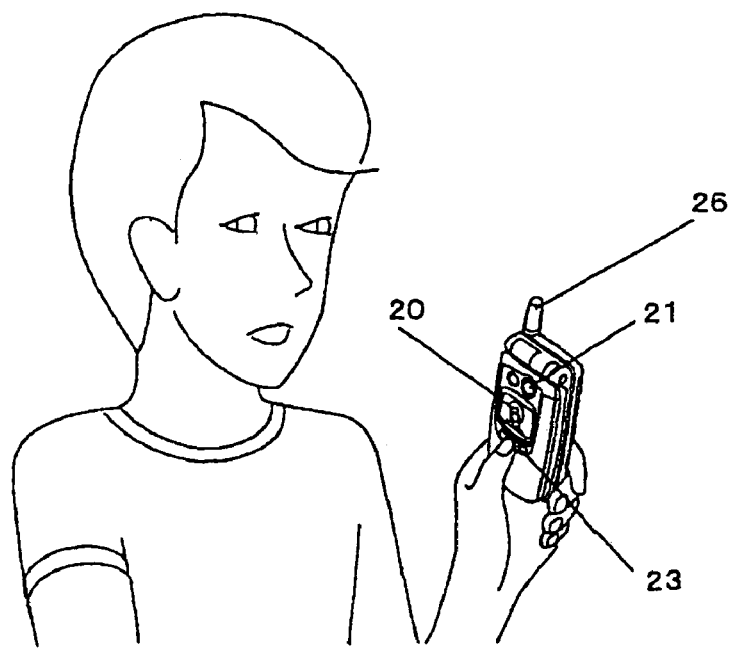
FIG. 5B shows a general manner of a user of the cellular phone of FIG. 1 taking a picture of himself/herself.

A manner of using cellular phone 1 according to an embodiment of the present invention in a camera shooting operation will be described with reference to FIGS. 5A and 5B. When the user is to take a picture of a subject, he/she will open cellular phone 1 and aim camera unit 21 towards the subject, using first display unit 5 as a viewfinder, as shown in FIG. 5A. In this case, the user uses first shutter button 10 as the shutter button. Additionally, second shutter button 23 located at the back side plane of first case 2 can also be used. Consider the case where the user of cellular phone 1 takes a picture of himself/herself, as shown in FIG. 5B. The user can use second display unit 20 as a viewfinder to conduct shooting while confirming the pick-up image.

When a pick-up image is to be displayed at second display unit 20 in a general cellular phone, the image is reversed bilaterally to be displayed as a mirror reversed image in order to eliminate any inconvenience during confirmation through the screen. However, cellular phone 1 of the present invention is not limited thereto. Cellular phone 1 of the present invention allows the user to take a picture of himself/herself even with cellular phone 1 in an open state. However, it is generally considered that shooting in a folded manner is more convenient than taking the trouble of opening cellular phone 1.

Figure 6:
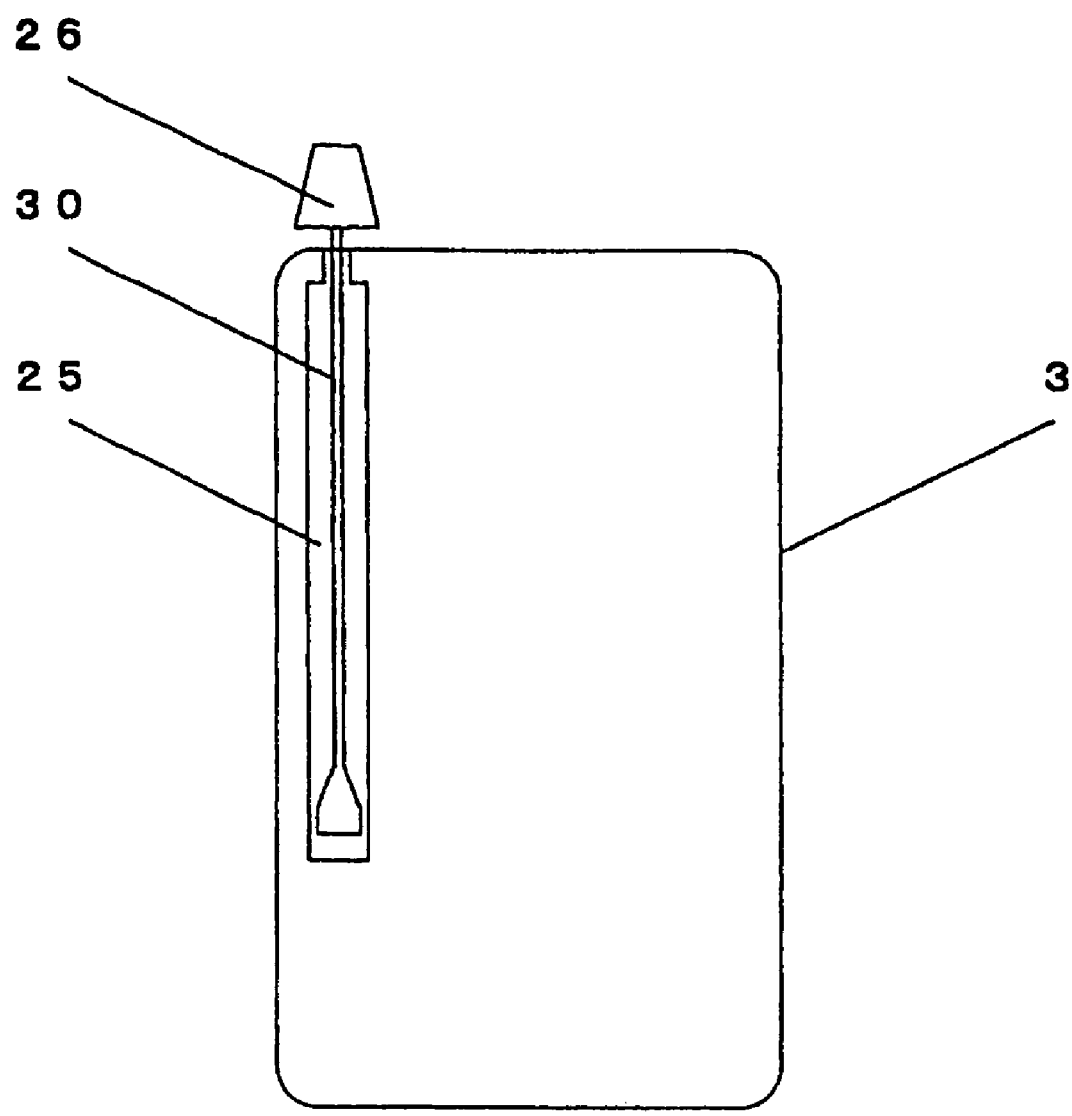
FIG. 6 is a schematic transverse sectional view of the cellular phone of FIG. 1.
Figure 7A:
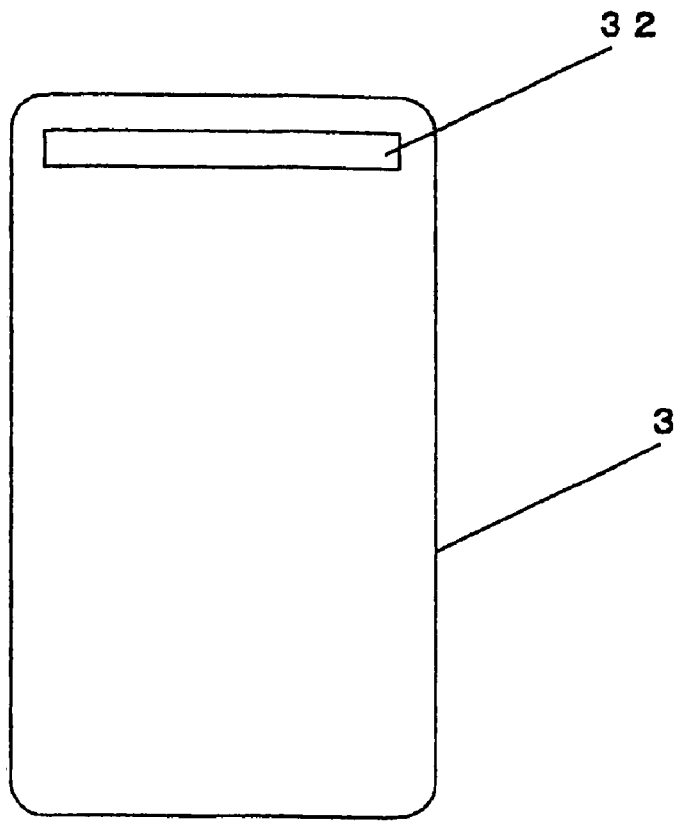
FIG. 7A shows another example of an antenna provided at the cellular phone of FIG. 1.
Figure 7B:
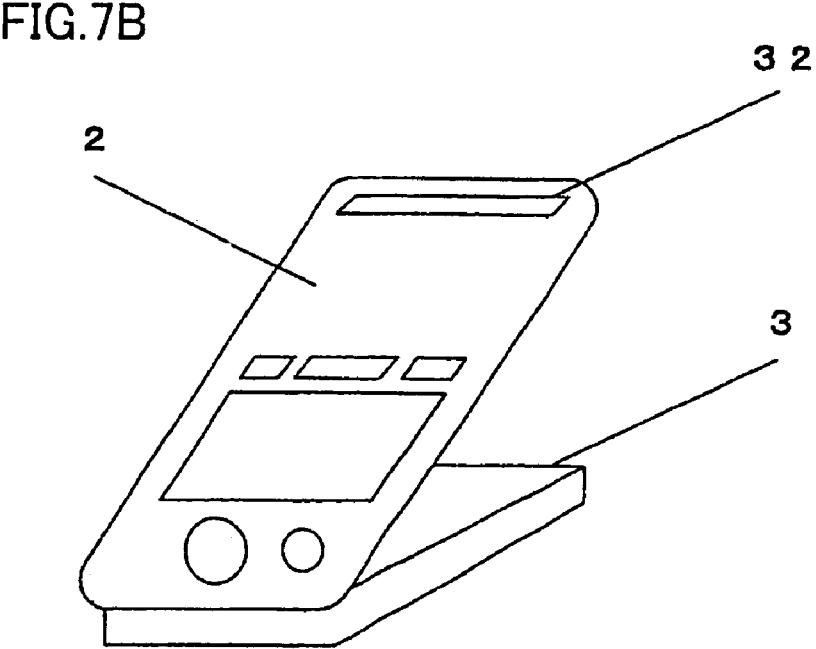
FIG. 7B shows still another example of an antenna provided at the cellular phone of FIG. 1.

Antenna unit 25 of cellular phone 1 will be described with reference to FIG. 6. A whip 30 of antenna unit 20 is configured at the left side end of second case 3 in a storable manner. Helical member 26 is exposed at second case 3. Whip 30 and helical member 26 can be pulled out from second case 3 in accordance with the radio field intensity during conversation. The antenna of cellular phone 1 is not limited to the above-described antenna formed of whip 30 and helical member 26. For example, the antenna of cellular phone 1 may be configured having an inversed F type built-in antenna 32 arranged at an upper side near hinge 4 of second case 3, as shown in FIG. 7, or arranged at an upper side of first case 2, as shown in FIG. 7B.

Figure 8:
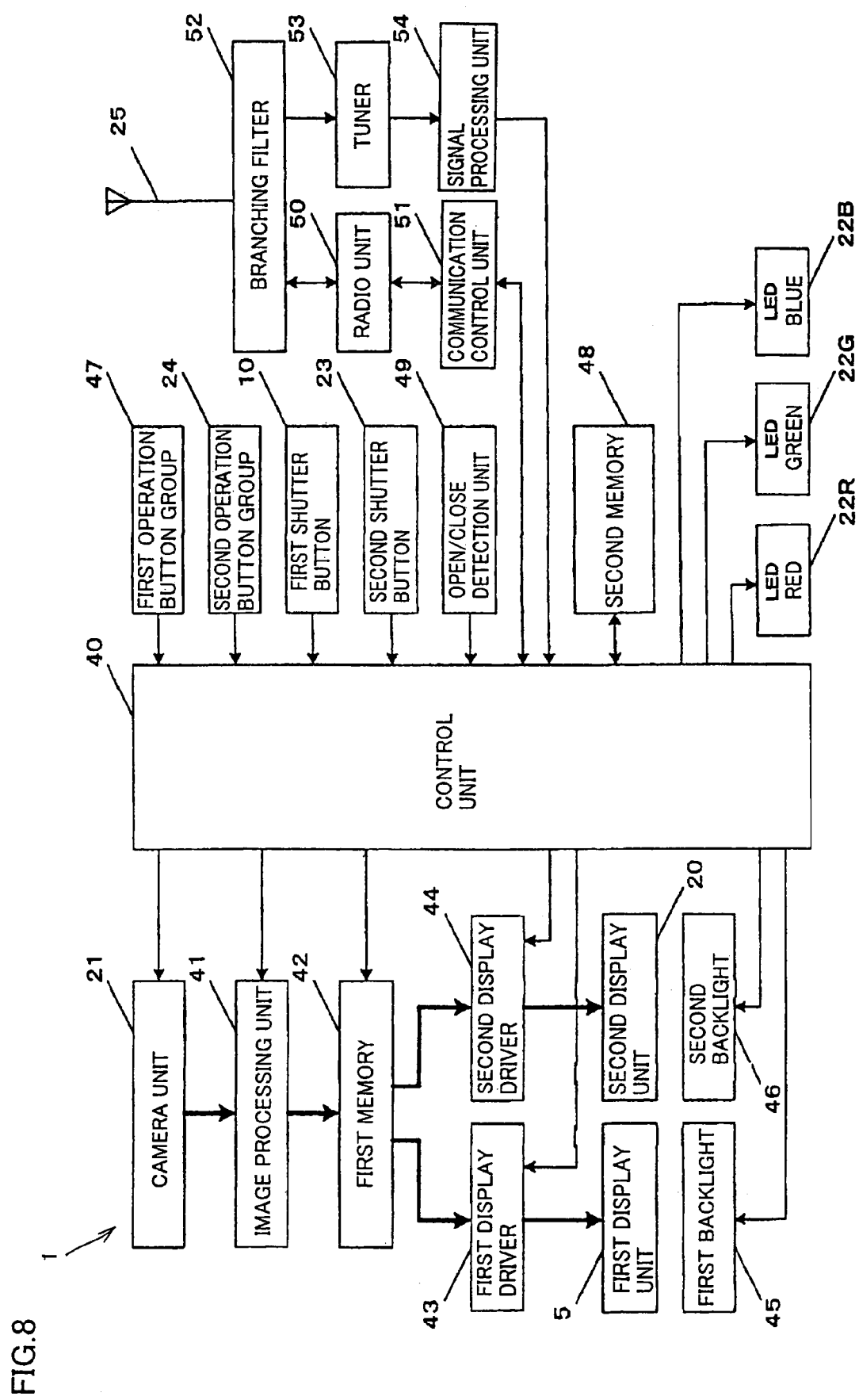
FIG. 8 is a block diagram of the cellular phone of FIG. 1.

The internal circuitry of cellular phone 1 will be described with reference to FIG. 8. A control unit 40 includes an operation control unit controlling the operation of various elements constituting cellular phone 1, a shutter button control unit, a backlight control unit, a light control unit and a display control unit. An image processing unit 41 includes an amplifier, an A/D (Analog/Digital) converter, and a signal processor. The amplifier amplifies electrical signals corresponding to RGB sent from camera unit 21 and provides the amplified signals to the A/D converter. The A/D converter converts an electrical signal (analog) corresponding to RGB amplified at the amplifier into a digital signal to output image data, which is provided to the signal processor. The signal processor subjects the image data from the A/D converter to signal processing such as pixel interpolation processing. The signal processor transmits the image data subjected to signal processing to a first memory 42 based on a control signal from control unit 40. Camera unit 21 and image processing unit 41 are image sensing means converting incident light into an electric signal for output as image data. First memory 42 temporarily stores image data continuously sent from the signal processor. Temporary storage is conducted by, for example, erasing the oldest image data, or by overwriting old image data with the most recent image data.

Control unit 40 transmits a control signal to first and second display drivers 43 and 44, and provides the image data stored in first memory 42 to first and second display drivers 43 and 44. First and second drivers 43 and 44 apply driving voltages to respective pixel electrodes of first and second display units 5 and 20 in accordance with the image data that is to be displayed at first and second display units 50 and 20.

First and second backlights 45 and 46 are formed of light emitting diodes or the like that are luminous elements to direct light on first and second display units 5 and 20 to increase the luminance. Turning on and off first and second backlights 45 and 46 as well as luminance adjustment and the like are under control of control unit 40. First and second backlights 45 and 46 can be controlled independent of each other. Control is provided so that first backlight 45 is turned on when an image is to be displayed at first display unit 5, and second backlight 46 is turned on when an image is to be displayed at second display unit 20. First and second backlights 45 and 46 may be configured to be turned on until a predetermined operation to turn off is conducted by the user or to be turned off at an elapse of a predetermined period of time from being turned on.

First operation button group 47 includes the aforementioned input button group 7 and function button group 8 of second case 3. The second operation button group is provided at first case 2, as described before.

First and second shutter buttons 10 and 23 are operated by the user when image data that is to be saved among the image data continuously provided and temporarily stored in first memory 42 is to be stored in second memory 48, whereby a signal designating storage is output to control unit 40. Control unit 40 responds to a designation signal from first and second shutter buttons 10 and 23 to store the image data present in first memory 42 into second memory 48. Second memory 48 is identified as reception means for storing image data from first memory 42 as well as various reception data received via antenna unit 25. Second shutter button 23 is arranged so as to be located at the outer side, below second display unit 20 when cellular phone 1 is in a folded state. First shutter button 10 is arranged in function button group 8, as shown in FIG. 1. First shutter button 10 may be provided as a unitary function or commonly used with another function button.

Open/close detection unit 49 is identified as detection means for detecting whether cellular phone 1 is folded or not. A detection switch (not shown) is provided in hinge 4 to send a signal to control unit 40 in accordance with the open/close state. Determination is made whether cellular phone 1 attains a folded state or not by control unit 40.

Antenna unit 25 transmits and receives voice data, text data, image data and the like when establishing radio communication with a base station through radiowaves. A radio unit 50 demodulates data received from a base station via antenna unit 25 in a reception mode, and transmits text data and image data from a communication control unit 51 to control unit 40 based on a predetermined protocol in a transmission mode. Reception data from another party received via radio unit 50 and communication control unit 51 is stored in second memory 48. Cellular phone 1 of FIG. 8 is capable of receiving television signals, and includes a branching filter 52 to separate signals from antenna unit 25 into the wave for radio communication and the television broadcast signal wave. Branching filter 52 transmits the radio communication wave to radio unit 50 and the television broadcast signal wave to tuner 53. Tuner 53 receiving a television broadcast signal wave transmits to signal processing unit 54 the signal of a channel received at signal processing circuit 54. Signal processing unit 54 separates the signals into video signals and audio signals. The video signals are output to first or second display unit 50 or 20. The audio signals are output to first or second speaker 8 or 28.

Control unit 40 switches the display unit to display an image based on the image data temporarily stored in first memory 42 in response to the detected result of open/close detection unit 49. When detection is made that cellular phone 1 is folded by open/close detection unit 49, control unit 40 provides the image data from first memory 42 to second display driver 44 to display an image at second display unit 20. When detection is made that cellular phone 1 is not folded (open) by open/close detection unit 49, control unit 40 provides the image data from first memory 42 to first display driver 43 to display an image at first display unit 5.

Camera unit 21 is provided so as to be located at the outer side when cellular phone 1 is folded. When a picture of a subject other than the user of cellular phone 1 is to be taken, the user aims camera unit 21 with cellular phone 1 in an open state towards the subject located opposite to the user, as shown in FIG. 5A. In this context, open/close detection unit 49 detects that cellular phone 1 is open, i.e., not folded. Therefore, an image based on image data output from camera unit 21 is displayed at first display unit 5. Accordingly, the user can use first display unit 5 as the viewfinder in the shooting operation.

In the case where the user of cellular phone 1 is to take a picture of himself/herself, the user aims camera unit 21 to himself/herself with cellular phone 1 in a folded state, as shown in FIG. 5B. In this context, open/close detection unit 49 detects that cellular phone 1 is folded. Therefore, an image based on image data output from camera unit 21 is displayed at second display unit 20. Accordingly, the user can use second display unit 20 as a viewfinder in the shooting operation.

Cellular phone 1 according to an embodiment of the present invention has display units 5 and 20 appropriately switched to be used as a viewfinder during shooting in response to the user just flipping down or flipping up first case 2 while holding second case 3 of cellular phone 1 with his/her hand to allow shooting. Therefore, the user does not have to change his/her hand holding position of second case 3 when the subject to be shot is to be changed, as required in a conventional cellular phone. The extra action of the user when the subject of image pick-up is to be switched can thus be eliminated. The operability and convenience are improved.

Control of first and second shutter buttons 10 and 23 will be described hereinafter.

Control unit 40 responds to the detected result of open/close detection unit 49 to switch between the valid shutter button for depression. Specifically, when open/close detection unit 49 detects that cellular phone 1 is folded, control unit 40 places the depression of second shutter button 23 valid. When open/close detection unit 49 detects that cellular phone 1 is open, control unit 40 places the depression of first shutter button 10 valid and the depression of second shutter button 23 invalid. Placing the depression of first and second shutter buttons 10 and 23 invalid can be realized by various ways such as locking first and second shutter buttons 10 and 23 to disable operation by the user, suppressing output of a designation signal from first and second shutter buttons 20 and 23 to control unit 50 without locking first and second shutter buttons 10 and 23, or inhibiting control unit 40 from processing a designation signal from first and second shutter buttons 10 and 23.

Since camera unit 21 is located at the outer side when cellular phone 1 is folded, the user will aim camera unit 21 towards a subject located opposite to the user with cellular phone 1 open when a picture of a subject other than the user of cellular phone 1 is to be taken. In this context, open/close detection unit 49 detects that cellular phone 1 is open. Therefore, designation from first shutter button 10 is placed valid. The user operates first shutter button 10 arranged at the same side as first display unit 5 while looking at first display unit 5 functioning as a viewfinder.

When the user of cellular phone 1 is to take a picture of himself/herself, the user can aim camera unit 21 towards himself/herself with cellular phone 1 in a folded state. In this context, open/close detection unit 49 detects that cellular phone 1 is folded. Therefore, designation from second shutter button 23 is placed valid. The user operates second shutter button 23 arranged at the same outer side as second display unit 20 while looking at second display unit 20 functioning as a viewfinder.

Thus, by just folding or opening cellular phone 1, designation from first shutter button 10 or second shutter button 23 located at the same side as first display unit 5 or second display unit 20 that is currently used is placed valid. Therefore, the user can easily identify and depress first shutter button 10 or second shutter button 23 while confirming the image through first or second display unit 5 or 20. The operability of the cellular phone is improved.

In general, a shutter button located at a side opposite to the display unit used as a viewfinder is not easily discernable by the user. There is a possibility of erroneous depression when the user is holding cellular phone 1 to conduct an operation other than depression of a shutter button. In the present embodiment, designation from second butter button 23 located at a side opposite to first display unit 5 used as a viewfinder is rendered invalid by just opening cellular phone 1. Therefore, inadvertent operation of the user can be prevented.

When detection is made of cellular phone 1 attaining a open state, depression of second shutter button 23 can be rendered valid instead of invalid. In this case, the user can operate any of first and second shutter buttons 10 and 23. Since first shutter button 10 is arranged at the inner side when in a folded state, the user cannot operate first shutter button when cellular phone 1 attains a folded state. Therefore, when open/close detection unit 49 detects that cellular phone 1 is folded, the depression of first shutter button 10 may be rendered either valid or invalid.

Control of first and second backlights 45 and 46 will be described hereinafter.

Control unit 40 switches the on/off of first and second backlights 45 and 46 based on the detected result of open/close detection unit 49. When open/close detection unit 49 detects that cellular phone 1 is folded, control unit 40 turns on second backlight 46 to increase the luminance of second display unit 20. When open/close detection unit 49 detects that cellular phone 1 is open, control unit 40 turns on first backlight 45 to increase the luminance of first display unit 5.

Thus, when the user is to take a picture of a subject other than himself/herself, first display unit 5 is used as the viewfinder. Image data entered from camera unit 21 is displayed at first display unit 5. In this case, first backlight 45 is turned on to increase the luminance of first display unit 5.

When the user of cellular phone 1 is to take a picture of himself/herself, second display unit 20 is used as a viewfinder. Image data entered from camera unit 21 is displayed at second display unit 20. In this case, second backlight 46 is turned on to increase the luminance of second display unit 20.

Since the backlight supplying light to the display unit that is used as the viewfinder is turned on or off corresponding to cellular phone 1 in a folded or open state, a better view of the displayed image is provided to improve visual confirmation.

Figure 9:
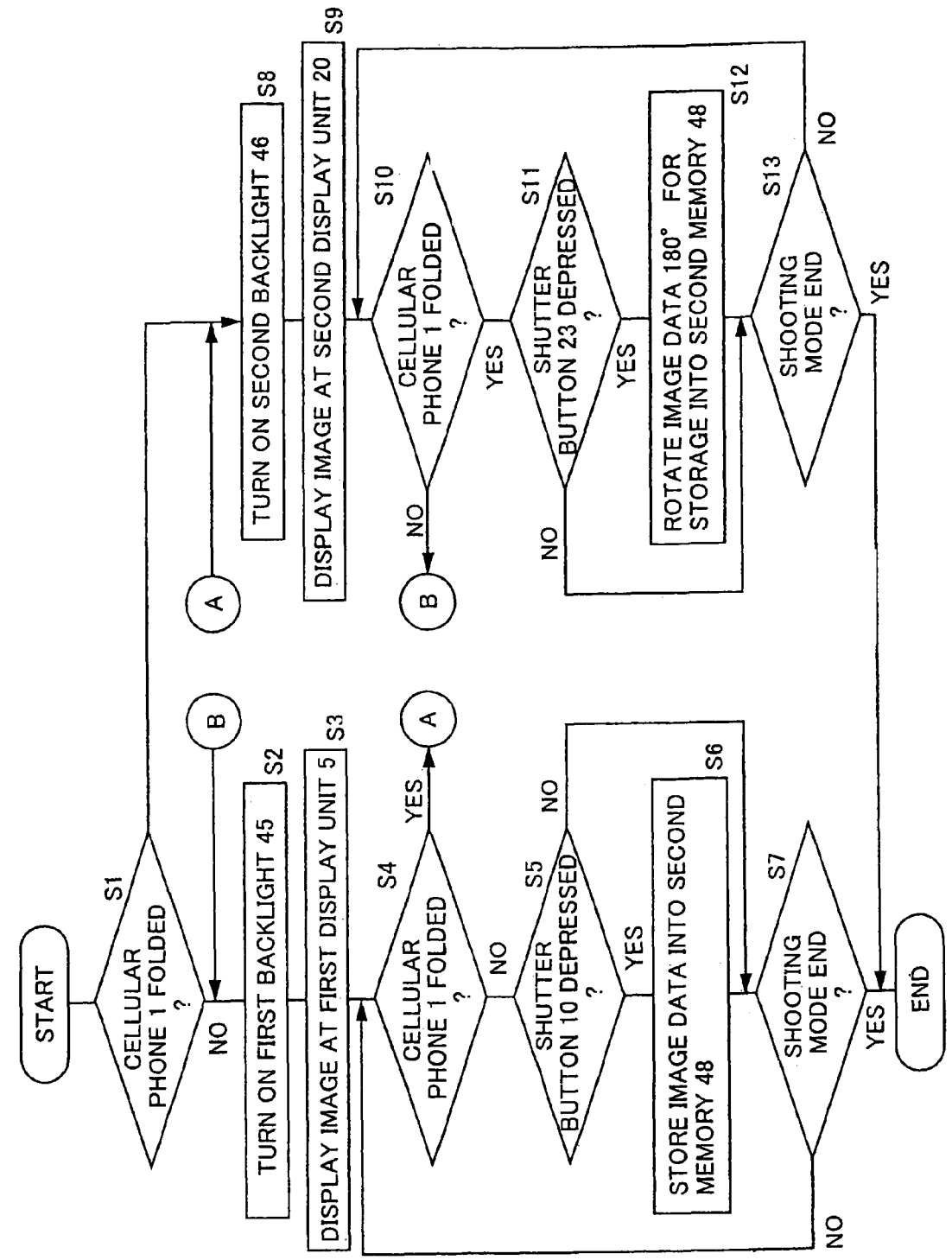
FIG. 9 is a flow chart of an image pick-up process executed by the cellular phone of FIG. 1.
Figure 10:
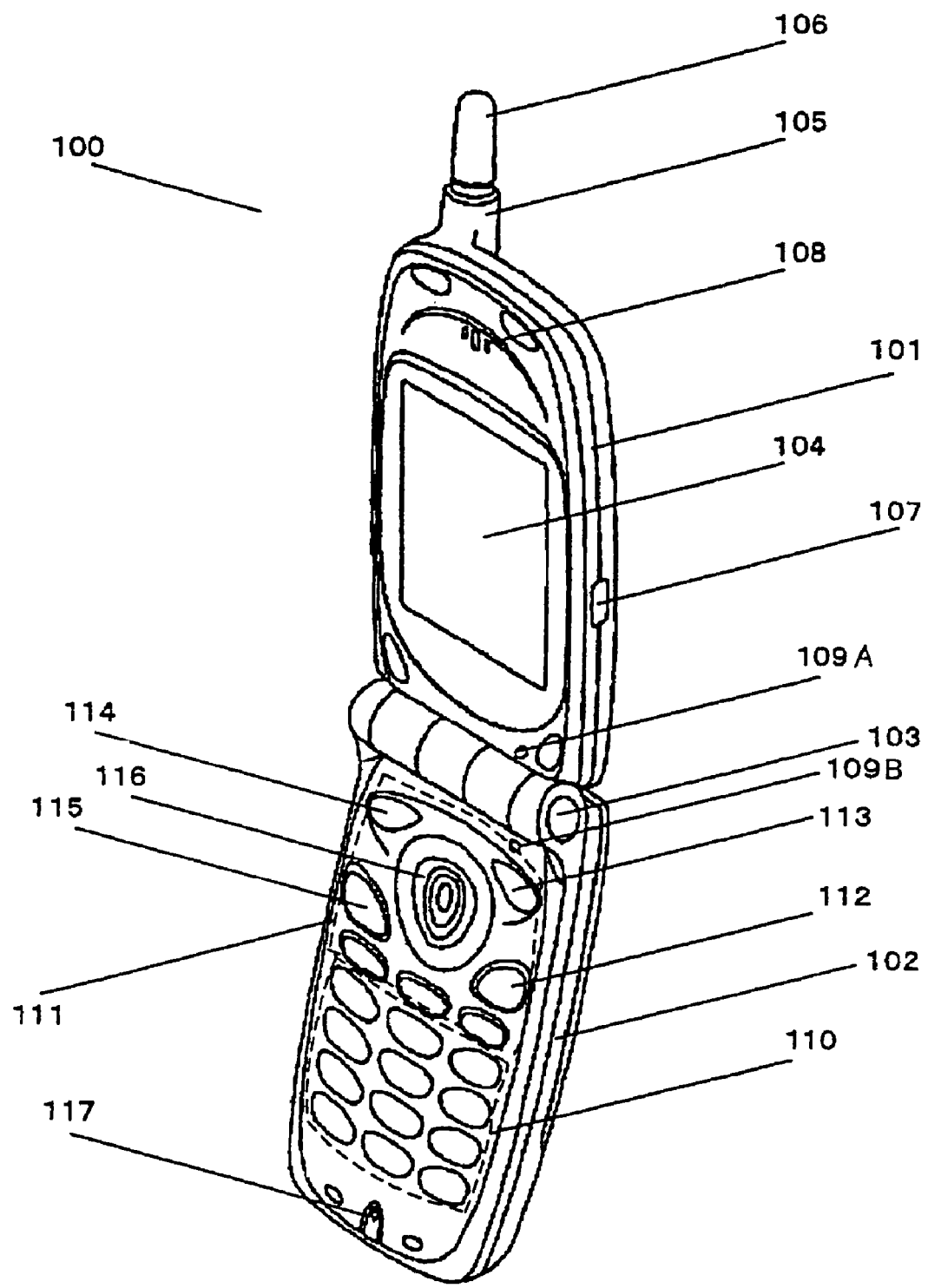
FIG. 10 is a perspective view of an appearance of a conventional cellular phone.
Figure 11:
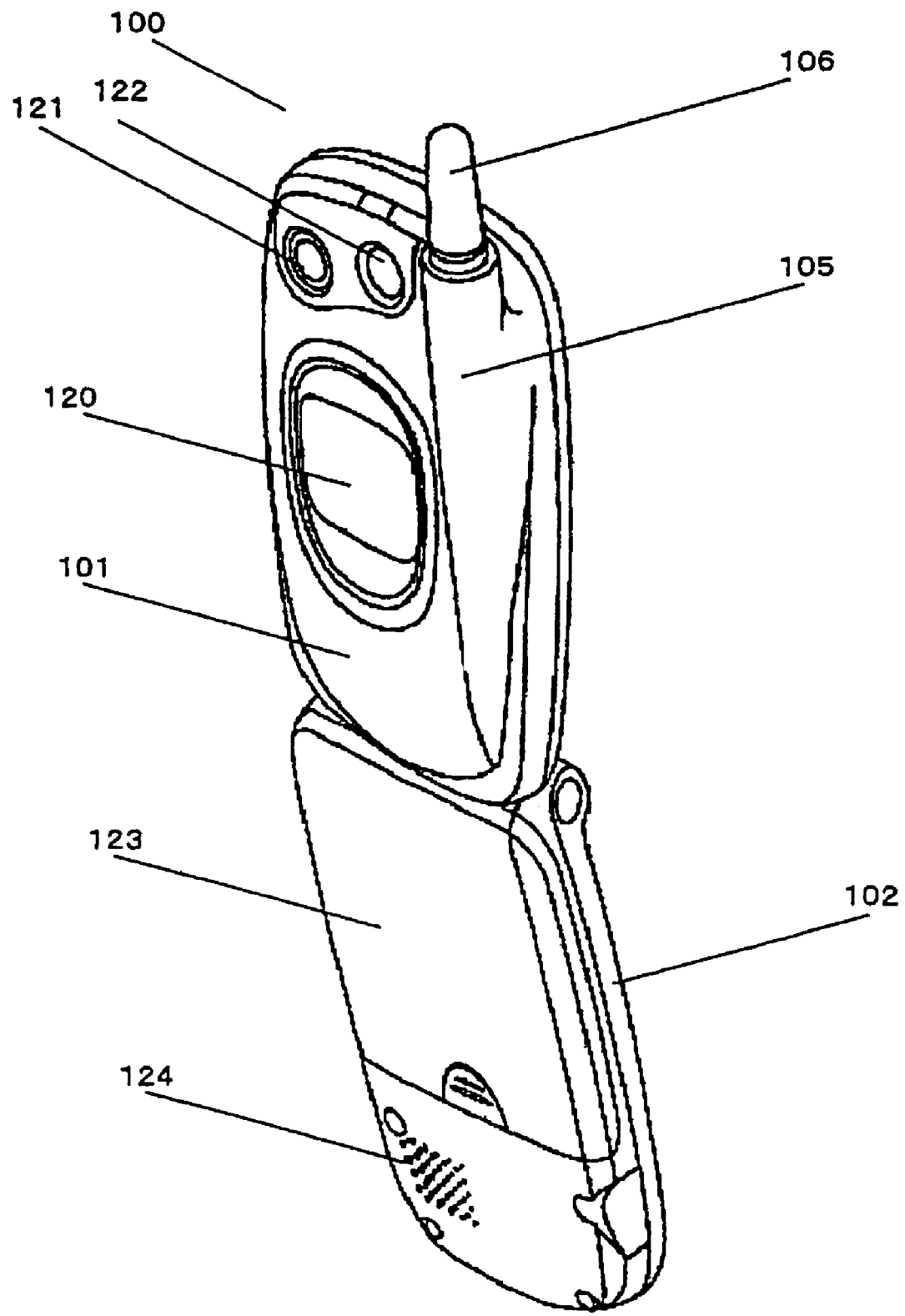
FIG. 11 is a perspective view of the appearance of a conventional cellular phone when viewed from the back side.
Figure 12:
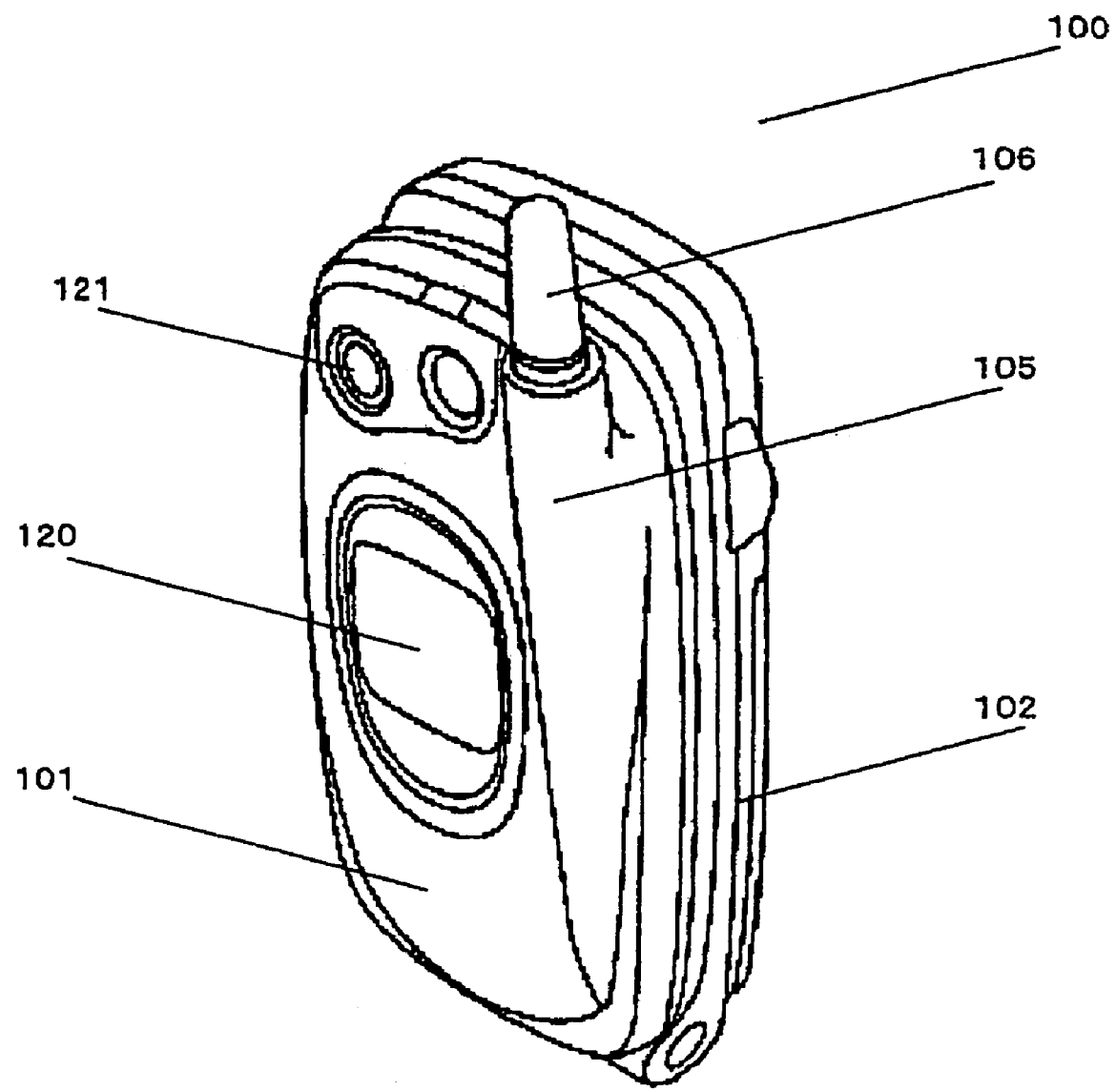
FIG. 12 is a perspective view of the appearance of a conventional cellular phone in a folded state.
Figure 13:
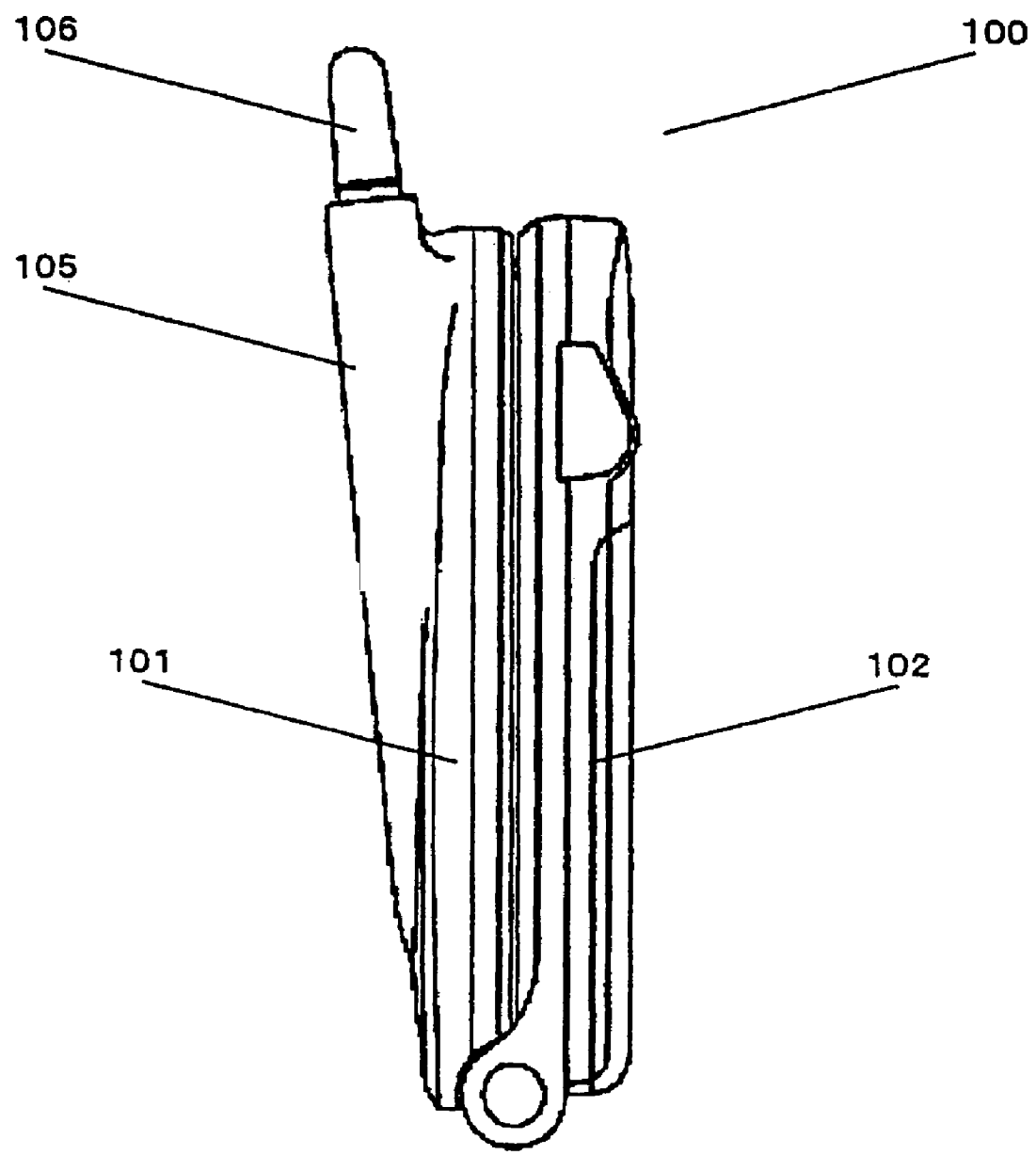
FIG. 13 is a side view of the appearance of a conventional cellular phone in a folded state.
Figure 14A:
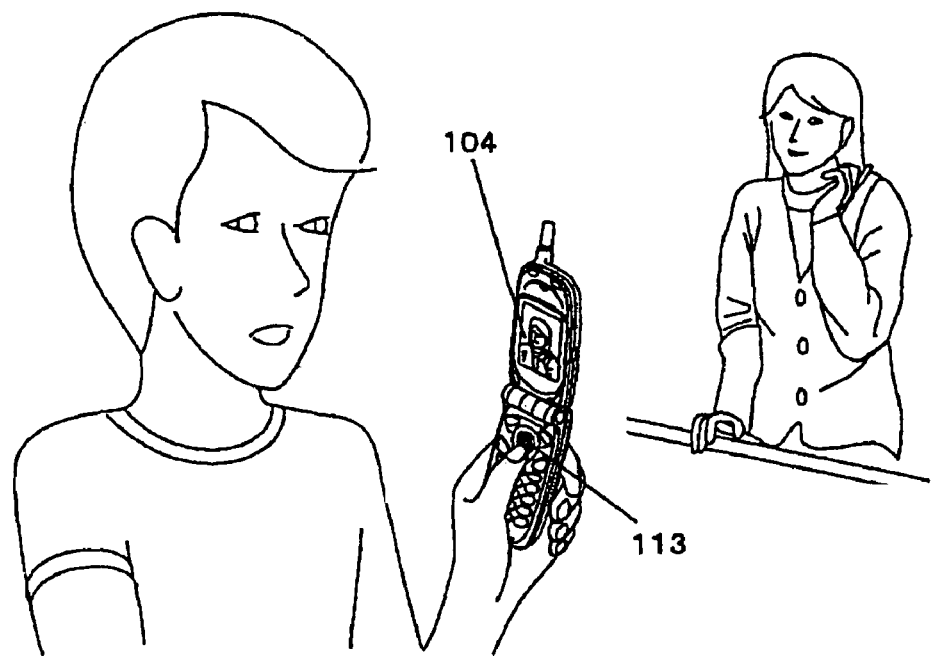
FIG. 14A shows a general manner of a user of a conventional cellular phone taking a picture of a subject.
Figure 14B:
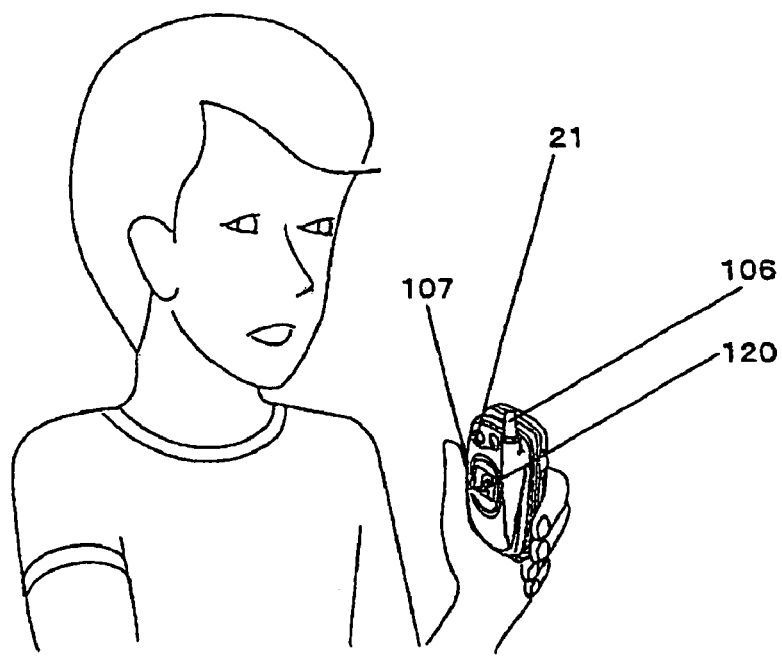
FIG. 14B shows a general manner of a user of the conventional cellular phone taking a picture of himself/herself.

FIG. 9 is a flow chart of an image sensing process carried out in cellular phone 1. Description is mainly based on a pick-up image being rotated 180° when shooting is conducted with cellular phone 1 in a folded state. Cellular phone 1 can attain a shootable state, i.e., enter a shooting mode, through a predetermined operation either from a folded state or an open state.

At step S1, control unit 40 determines whether cellular phone 1 is folded or not based on the detected result from open/close detection unit 49. When cellular phone 1 is open and not folded, control proceeds to step S2, otherwise, to step S8. At step S2, first backlight 45 is turned on. At step S3, image data entered through image pick-up unit 2 is displayed at first display unit 5. Then, control proceeds to step S4.

At step S4, control unit 40 determines whether cellular phone 1 is folded or not based on the detected result of open/close detection unit 49. If cellular phone 1 is open, control proceeds to step S5. If cellular phone attains a folded state, the lighting of first backlight 45 and image display at first display unit 5 are suppressed. Then control proceeds to step S8.

At step S5, control unit 40 places the depression of second shutter button 23 invalid, and detects whether first shutter button 10 is depressed or not. If first shutter button 10 is depressed, control proceeds to step S6, otherwise, to step S7. At step S6, image data temporarily stored in first memory 42 is stored in second memory 48. Then, control proceeds to step S7. At step S7, control unit 40 determines whether a predetermined operation to terminate the shooting mode has been conducted by the user or not. If this operation has been conducted, the process ends, otherwise, control returns to step S4. When the shooting mode is terminated, predetermined awaiting screens or the like are displayed at first and second display units 5 and 20.

When determination is made of cellular phone 1 being folded by control unit 40 at step S1, control proceeds to step S8 to turn on second backlight 46. At step S9, image data entered through camera unit 21 is displayed at second display unit 20. Then, control proceeds to step S10.

At step S10, control unit 40 determines whether cellular phone 1 is folded or not based on the detection result of open/close detection unit 49. If cellular phone 1 is open, the lighting of second backlight 46 and image display at second display unit 20 are suppressed. Then, control proceeds to step S2. If cellular phone 1 is folded, control proceeds to step S11.

At step S11, control unit 40 detects whether second shutter button 23 is depressed or not. If depressed, control proceeds to step S12, otherwise to step S13. At step S12, a 180° rotated version of the image data temporarily stored in first memory 42 is stored into second memory 48. Then control proceeds to step S13.

The rotation of 180° is conducted since camera 21 is oriented upside down between an open state and a closed state of cellular phone 1. By having the image data that is taken in a folded state rotated 180° to be stored in second memory 48, that image data will not appear in an upside down manner when subsequently displayed at either first or second display unit 5 or 20. At step S13, control unit 40 determines whether a predetermined operation to terminate the shooting mode has been conducted by the user or not. If this predetermined operation has been conducted, the process ends, otherwise, control returns to step S10. When the shooting mode ends, predetermined awaiting screens are displayed at first and second display units 5 and 20.

Since the display unit used as a viewfinder during shooting is switched appropriately in response to cellular phone 1 being opened/closed, the user does not have to conduct any button operation to switch the display. The extra action for switching is eliminated. Thus, the operability and convenience are improved. Since depression of the shutter button located at the same side as the display unit functioning as a viewfinder is placed valid in response to detection of cellular phone 1 being opened/closed, depression of a shutter button can be reliably effected while viewing through the viewfinder. Thus, the operability is improved. Furthermore, since depression of the shutter button located opposite to the side where the display unit functioning as a viewfinder is disabled, erroneous operation such as depressing the shutter button inadvertently can be prevented. In response to detection of cellular phone 1 being opened/closed, the backlight of the display unit functioning as a viewfinder is turned on to provide a better view of the image. Therefore, visual confirmation is improved. When shooting is conducted in a folded state, the image data is rotated 180 degrees to be stored in second memory 48. This prevents the stored image data from being displayed upside down when viewed afterwards.

In FIGS. 1-5, description is provided based on the case where first and second displays units 5 and 20 are arranged at first case 2. The present invention is not limited thereto. First and second display units 5 and 20 may be arranged so that one is located at the inner side and the other is located at the other side when cellular phone 1 is folded.

Although cellular phone 1 of the present embodiment is described as having the picked-up image rotated 180 degrees to be saved when an image is shot in a folded state, the present invention is not limited thereto. Conversely, the image taken with cellular phone 1 in a folded state can be directly stored, whereas the image taken with cellular phone 1 in an open state is rotated 180° to be stored. In this case, image data is rotated 180° at step S6 of FIG. 9 and then stored in memory 48.

An embodiment of the present invention was described based on a cellular phone 1. It will be understood that such description is merely exemplary, and is equally applicable to a structure such as a notebook type personal computer (PC), a PDA (Personal Digital System), or the like, configured in a foldable manner, and that includes an image pick-up unit as well as respective display units arranged at an inner side and outer side when in a folded state.

Furthermore, switching the display unit to be enabled for display is not limited to the case where display units 5 and 20 are used as viewfinders. Switching the display unit for providing a predetermined display at display units 5 and 20 may be conducted upon detecting whether cellular phone 1 is open or closed.

In the above-described embodiment of the present invention, camera unit 21 is arranged at the same first case 2 as second display unit 20. Camera unit 21 may be provided on the surface of hinge 4 as long as visual confirmation together with second display unit 20 is allowed at the same time when cellular phone 1 attains a folded state.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A cellular phone comprising:
   a first case,
   a second case, and
   a coupling unit for coupling said first case and said second case,
   said cellular phone attaining a folded state and an open state by said first case or said second case pivoting about said coupling unit,
   wherein said first case includes
   a first display unit located at an inner side when said cellular phone is in said folded state, and
   a second display unit located at an outer side when said cellular phone is in said folded state,
   wherein said cellular phone further comprising
   an image pick-up unit located at an outer side when said cellular phone is in said folded state,
   an open/close detector for detecting whether said cellular phone is in said folded state or said open state, and
   a display control unit for controlling display operations of said first and second display units based on the detected state by said open/close detector, wherein
   said display control unit causes said second display unit to be used as a viewfinder and to display the image picked up by said image pick-up unit such that a top of the image in an upright orientation is located at an upper side of said second display unit adjacent to said coupling unit when said cellular phone is in said folded state and suppresses said display of said picked up image by said second display unit when said cellular phone is moved into said open state.

2. The cellular phone according to claim 1, wherein said first case further includes a shutter button to store an image picked up by said image pick-up unit, located at an outer side when said cellular phone is in said folded state.

3. The cellular phone according to claim 1, wherein said cellular phone further comprises a zoom adjustment button located at an outer side when said cellular phone is in said folded state.

4. The cellular phone according to claim 1, wherein said display control unit causes said second display unit to display a mirror reversed image of the image picked up by said image pick up unit in said folded state.

5. The cellular phone according to claim 1, wherein said display control unit to store rotating substantially 180° the image picked up by said image pick-up unit in said folded state to the image picked up by said image pick-up unit in said open state.

6. A cellular phone comprising:
   a first case,
   a second case, and
   a coupling unit for coupling said first case and said second case,
   said cellular phone attaining a folded state and an open state by said first case or said second case pivoting about said coupling unit,
   wherein said first case includes
   a first display unit located at an inner side when said cellular phone is in said folded state, and
   a second display unit located at an outer side when said cellular phone is in said folded state,
   wherein said cellular phone further comprising
   an image pick-up unit located at an outer side when said cellular phone is in said folded state,
   an open/close detector for detecting whether said cellular phone is in said folded state or said open state, and
   a display control unit for controlling display operations of said first and second display units based on the detected state by said open/close detector, wherein
   said display control unit causes said second display unit to be used as a viewfinder and to display the image picked up by said image pick-up unit such that a top of the image in an upright orientation is located at an upper side of said second display unit adjacent to said coupling unit when said cellular phone is in said folded state and causes said first display unit to be used as a viewfinder when said cellular phone is in said open state.

7. The cellular phone according to claim 6, wherein said first case further includes a shutter button to store an image picked up by said image pick-up unit, located at an outer side when said cellular phone is in said folded state.

8. The cellular phone according to claim 6, wherein said cellular phone further comprises a zoom adjustment button located at an outer side when said cellular phone is in said folded state.

9. The cellular phone according to claim 6, wherein said display control unit causes said second display unit to display a mirror reversed image of the image picked up by said image pick-up unit in said folded state.

10. The cellular phone according to claim 6, wherein said display control unit to store rotating substantially 180° the image picked up by said image pick-up unit in said folded state to the image picked up by said image pick-up unit in said open state.

11. A cellular phone comprising:

a first case, a second case, and a coupling unit for coupling said first case and said second case, said cellular phone attaining a folded state and an open state by said first case or said second case pivoting about said coupling unit, wherein said first case includes a first display unit located at an inner side when said cellular phone is in said folded state, and a second display unit located at an outer side when said cellular phone is in said folded state, wherein said cellular phone further comprising an image pick-up unit located at an outer side when said cellular phone is in said folded state, an open/close detector for detecting whether said cellular phone is in said folded state or said open state, and a display control unit for controlling display operations of said first and second display units based on the detected state by said open/close detector, wherein said display control unit causes said second display unit to be used as a viewfinder and to display a text and the image picked up by said image pick-up unit such that a top of the text and the image in an upright orientation is located at an upper side of said second display unit adjacent to said coupling unit when said cellular phone is in said folded state and suppresses said display of said picked up image by said second display unit when said cellular phone is moved into said open state.

12. The cellular phone according to claim 11, wherein said first case further includes a shutter button to store an image picked up by said image pick-up unit, located at an outer side when said cellular phone is in said folded state.

13. The cellular phone according to claim 11, wherein said cellular phone further comprises a zoom adjustment button located at an outer side when said cellular phone is in said folded state.

14. The cellular phone according to claim 11, wherein said display control unit causes said second display unit to display a mirror reversed image of the image picked up by said image pick-up unit in said folded state.

15. The cellular phone according to claim 11, wherein said display control unit to store rotating substantially 180° the image picked up by said image pick-up unit in said folded state to the image picked up by said image pick-up unit in said open state.

16. A cellular phone comprising:

a first case, a second case, and a coupling unit for coupling said first case and said second case, said cellular phone attaining a folded state and an open state by said first case or said second case pivoting about said coupling unit, wherein said first case includes a first display unit located at an inner side when said cellular phone is in said folded state, and a second display unit located at an outer side when said cellular phone is in said folded state, wherein said cellular phone further comprising an image pick-up unit located at an outer side when said cellular phone is in said folded state, an open/close detector for detecting whether said cellular phone is in said folded state or said open state, and a display control unit for controlling display operations of said first and second display units based on the detected state by said open/close detector, wherein said display control unit causes said second display unit to be used as a viewfinder and to display a text and the image picked up by said image pick-up unit such that a top of the text and the image in an upright orientation is located at an upper side of said second display unit adjacent to said coupling unit when said cellular phone is in said folded state and causes said first display unit to be used as a viewfinder when said cellular phone is in said open state.

17. A cellular phone comprising:

a fist case, a second case, and a coupling unit for coupling said first case and said second case, said cellular phone attaining a folded state and an open state by said first case or said second case pivoting about said coupling unit, wherein said first case includes a first display unit located at an inner side when said cellular phone is in said folded state, and a second display unit located at an outer side when said cellular phone is in said folded state, wherein said cellular phone further comprising an image pick-up unit located at an outer side when said cellular phone is in said folded state, a first memory for storing image data picked up through said image pick-up unit, a second memory for storing text data, an open/close detector for detecting whether said cellular phone is in said folded state or said open state, and a display control unit for controlling display operations of said first and second display units based on the detected state by said open/close detector, wherein said display control unit causes said second display unit to be used as a viewfinder and to display the image picked up by said image pick-up unit such that a top of the image in an upright orientation is located at an upper side of said second display unit adjacent to said coupling unit when said cellular phone is in said folded state and suppresses said display of said picked up image by said second display unit when said cellular phone is moved into said open state, and said display control unit causes said second display unit to display text corresponding to said text data stored in said second memory such that a top of the text in an upright orientation is located at said upper side of said second display in said folded state.

18. A cellular phone comprising:

a first case, a second case, and a coupling unit for coupling said first case and said second case, said cellular phone attaining a folded state and an open state by said first case or said second case pivoting about said coupling unit, wherein said first case includes a first display unit located at an inner side when said cellular phone is in said folded state, and a second display unit located at an outer side when said cellular phone is in said folded state, wherein said cellular phone further comprising an image pick-up unit located at an outer side when said cellular phone is in said folded state, an open/close detector for detecting whether said cellular phone is in said folded state or said open state, a display control unit for controlling display operations of said first and second display units based on the detected state by said open/close detector, a first memory for storing said image data picked up through said image pick-up unit, and a second memory for storing text data, wherein said display control unit causes said second display unit to be used as a viewfinder and to display the image picked up by said image pick-up unit such that a top of the image in an upright orientation is located at an upper side of said second display unit adjacent to said coupling unit when said cellular phone is in said folded state and causes said first display unit to be used as a viewfinder when said cellular phone is in said open state, and said display control unit causes said second display unit to display text corresponding to said text data stored in said second memory such that a top of the text in an upright orientation is located at said upper side of said second display in said folded state.

* * * * *

UNITED STATES PATENT AND TRADEMARK OFFICE
CERTIFICATE OF CORRECTION

| | | |
|---|---|---|
| PATENT NO. | : 7,797,020 B2 | Page 1 of 1 |
| APPLICATION NO. | : 11/709682 | |
| DATED | : September 14, 2010 | |
| INVENTOR(S) | : Kohji Sawayama et al. | |

It is certified that error appears in the above-identified patent and that said Letters Patent is hereby corrected as shown below:

ON THE TITLE PAGE:

At item (45), Date of Patent, change "Sep. 14, 2010" to -- *Sep. 14, 2010 --.

On the Title Page:

The first or sole Notice should read --

Subject to any disclaimer, the term of this patent is extended or adjusted under 35 U.S.C. 154(b) by 673 days.

This patent is subject to a terminal disclaimer. --

Signed and Sealed this
Twenty-fourth Day of May, 2011

David J. Kappos
*Director of the United States Patent and Trademark Office*